(12) United States Patent
Abbas et al.

(10) Patent No.: US 12,274,995 B2
(45) Date of Patent: Apr. 15, 2025

(54) POROUS NANOCOMPOSITES

(71) Applicant: Regents of the University of Minnesota, Minneapolis, MN (US)

(72) Inventors: Abdennour Abbas, Minneapolis, MN (US); John Brockgreitens, Minneapolis, MN (US); Snober Ahmed, Minneapolis, MN (US); Fatemeh Heidari, St Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 202 days.

(21) Appl. No.: 16/497,155

(22) PCT Filed: Mar. 23, 2018

(86) PCT No.: PCT/US2018/024100
§ 371 (c)(1),
(2) Date: Sep. 24, 2019

(87) PCT Pub. No.: WO2018/175936
PCT Pub. Date: Sep. 27, 2018

(65) Prior Publication Data
US 2021/0087076 A1 Mar. 25, 2021

Related U.S. Application Data

(60) Provisional application No. 62/476,166, filed on Mar. 24, 2017.

(51) Int. Cl.
*B01J 20/02* (2006.01)
*B01J 20/26* (2006.01)
(Continued)

(52) U.S. Cl.
CPC ............ *B01J 20/02* (2013.01); *B01J 20/262* (2013.01); *B01J 20/28007* (2013.01);
(Continued)

(58) Field of Classification Search
None
See application file for complete search history.

(56) References Cited

U.S. PATENT DOCUMENTS 3,499,837 A 3/1970 Jaunarajs
5,911,882 A 6/1999 Benjamin et al.
(Continued)

FOREIGN PATENT DOCUMENTS

CN 1068065 A 1/1993
CN 1847159 A 10/2006
(Continued)

OTHER PUBLICATIONS

Li et al. (The Journal of Adhesive Dentistry, 2003, 5, pp. 19-25) (Year: 2003).*

(Continued)

*Primary Examiner* — Clare M Perrin
(74) *Attorney, Agent, or Firm* — Padda Law Group

(57) ABSTRACT

The article includes a porous scaffold structure comprising a plurality of supports. The article further includes a plurality of metallic or non-metallic nanomaterials disposed on at least one of the supports. Each of the plurality of metallic or non-metallic nanomaterials is directly bound to at least one of the supports.

9 Claims, 19 Drawing Sheets

(51) Int. Cl.
| | |
|---|---|
| *B01J 20/28* | (2006.01) |
| *B01J 20/30* | (2006.01) |
| *B01J 20/32* | (2006.01) |
| *C02F 1/28* | (2023.01) |
| *B82Y 30/00* | (2011.01) |
| *C02F 1/62* | (2023.01) |
| *C02F 101/10* | (2006.01) |
| *C02F 101/16* | (2006.01) |
| *C02F 101/20* | (2006.01) |
| *C02F 101/32* | (2006.01) |
| *C02F 101/36* | (2006.01) |
| *C02F 103/00* | (2006.01) |

(52) U.S. Cl.
CPC ....... *B01J 20/3078* (2013.01); *B01J 20/3085* (2013.01); *B01J 20/3206* (2013.01); *B01J 20/3212* (2013.01); *B01J 20/3217* (2013.01); *B01J 20/3236* (2013.01); *C02F 1/288* (2013.01); *B82Y 30/00* (2013.01); *C02F 1/62* (2013.01); *C02F 2101/103* (2013.01); *C02F 2101/105* (2013.01); *C02F 2101/108* (2013.01); *C02F 2101/16* (2013.01); *C02F 2101/20* (2013.01); *C02F 2101/327* (2013.01); *C02F 2101/363* (2013.01); *C02F 2101/366* (2013.01); *C02F 2103/007* (2013.01); *C02F 2303/04* (2013.01)

(56) References Cited

U.S. PATENT DOCUMENTS

| | | | |
|---|---|---|---|
| 9,828,458 | B2 | 11/2017 | Suri et al. |
| 2007/0039299 | A1 | 2/2007 | Zeller et al. |
| 2007/0101825 | A1* | 5/2007 | He .................... B22F 9/24 75/370 |
| 2010/0209696 | A1* | 8/2010 | Seals .................... B01J 2/006 977/773 |
| 2011/0014102 | A1 | 1/2011 | Lei et al. |
| 2012/0018384 | A1 | 1/2012 | Sawyer |
| 2012/0128751 | A1* | 5/2012 | Parkar .................... A01N 59/16 977/773 |
| 2012/0322903 | A1* | 12/2012 | Karandikar ............ C08G 18/48 977/773 |
| 2012/0329935 | A1* | 12/2012 | Matsumura ............. C09D 5/30 977/773 |
| 2013/0098840 | A1 | 4/2013 | Helferich et al. |
| 2013/0264287 | A1* | 10/2013 | Zhang .................... C09C 1/3081 210/639 |
| 2013/0319931 | A1* | 12/2013 | Liu .................... D06M 23/08 210/488 |
| 2014/0231351 | A1* | 8/2014 | Wickramasinghe ........................ B01D 69/148 210/652 |
| 2014/0332459 | A1* | 11/2014 | Hu .................... B01D 39/1623 210/500.39 |
| 2019/0193048 | A1 | 6/2019 | Abbas et al. |

FOREIGN PATENT DOCUMENTS

| | | |
|---|---|---|
| CN | 102198929 A | 9/2011 |
| CN | 103298550 A | 9/2013 |
| CN | 103736475 A | 4/2014 |
| CN | 106102901 A | 11/2016 |
| CN | 106169573 A | 11/2016 |
| SU | 1431827 A1 | 10/1988 |
| WO | 2009/039467 | 3/2009 |
| WO | 2017/066453 | 4/2017 |

OTHER PUBLICATIONS

Ahmed et al. (Advanced Functional Materials, first published Mar. 6, 2017, vol. 27, 1-11) (Year: 2017).*
Aqion "pH of Common Acids and Bases", https://www.aqion.de/site/ph-of-common-acids, pp. 1-3, accessed online on Jul. 21, 2023. (Year: 2023).*
Millipore Sigma (accessed Jul. 21, 2023 at https://www.sigmaaldrich.com/US/en/product/mm/109081, pp. 1-13). (Year: 2023).*
LabChem (Silver Nitrate Safety Data Sheet, pp. 1-7, 2014, accessed at https://www.spectrumchemical.com/media/sds/LC22700_AGHS.pdf). (Year: 2014).*
Kwak et al. (Fibers and Polymers, 2016, 17, 1146-1153). (Year: 2016).*
Wu et al. (ACS Nano, 2013, 7, 3589-3597). (Year: 2013).*
Zhuang et al. (Carbon, 2016, 108, 190-198). (Year: 2016).*
ThermoFisher Scientific (Safety Data Sheet for Ferrous sulfate heptahydrate, 2009, pp. 1-7). (Year: 2009).*
Calcagnile et al. (ACS Nano, 2012, 6, 5413-5419). (Year: 2012).*
Picca et al. (ACS Biomater. Sci. Eng., 2017, 3, 1417-1425). (Year: 2017).*
Nikje et al. (Polymer Composites, 2015, 38, pp. 877-883). (Year: 2015).*
Lorusso et al. (Nanomaterials and Nanotechnology, 2017, 7, 1-9) (Year: 2017).*
Domenech et al. (New J. Chem., 2016, 40, 3716-3725). (Year: 2016).*
Sportelli et al. (Materials, 2016, 9, 544, 1-13) (Year: 2016).*
Mahfuz et al. (Composites: Part A, 2004, 35, 453-460). (Year: 2004).*
Jing et al. (Journal of Materials Chemistry A, 2015, 3, 15675-15682). (Year: 2015).*
Ambrozic et al. (Materials Research Bulletin, 2013, 48, 1428-1434). (Year: 2013).*
Agnihotri et al., "Size-controlled silver nanoparticles synthesized over the range 5-100 nm using the same protocol and their antibacterial efficacy," Royal Society of Chemistry Advances, vol. 4, Nov. 2013, 10 pp.
Ahmed et al., "A Nanoselenium Sponge for Instantaneous Mercury Removal to Undetectable Levels," Advanced Functional Materials, vol. 27, No. 17, Article No. 1606572, May 2017, 11 pp.
Ahmed et al., "Sponge-supported synthesis of colloidal selenium nanospheres," Nanotechnology, vol. 27, No. 46, Oct. 2016, 10 pp.
Akbarzadeh et al., "A novel thermal reduction method towards the synthesis and growth of two unlike morphologies of nickel nanostructures," Dalton Transactions, vol. 43, No. 14, Jan. 2014, 8 pp.
Arvaniti et al., "Reductive Degradation of Perfluorinated Compounds in Water using Mg-aminoclay coated Nanoscale Zero Valent Iron," Chemical Engineering Journal, vol. 262, Feb. 2015, 23 pp.
Bastin et al., "Phosphorus removal by a synthetic iron oxide-gypsum compound," Ecological Engineering, vol. 12, Nos. 3-4, Feb. 1999, 13 pp.
Cai et al., "Nanoporous Cellulose as Metal Nanoparticles Support," Biomacromolecules, vol. 10, No. 1, Nov. 2008, 8 pp.
Chen et al., "Arsenic adsorption via iron-preloaded activated carbon and zero-valent iron," Journal of American Water Works Association, vol. 100, No. 8, Aug. 2008, 10 pp.
Chen et al., "Arsenic removal by iron-modified activated carbon," Water Research, vol. 41, No. 9, May 2007, 8 pp.
Du et al., "Adsorption behavior and mechanism of perfluorinated compounds on various adsorbents—A review," Journal of Hazardous Materials, vol. 274, Jun. 2014, 12 pp.
Karoyo et al., "Tunable macromolecular-based materials for the adsorption of perfluorooctanoic and octanoic acid anions," Journal of Colloid and Interface Science, vol. 402, Jul. 2013, 8 pp.
Kimling et al., "Turkevich Method for Gold Nanoparticle Synthesis Revisited," Journal of Physical Chemistry B, vol. 110, No. 32, Jul. 2006, 8 pp.
Kumar et al., "Removal of Arsenic by Sorption to Iron-Coated Fibers," Water Research Foundation, Aug. 2009, 69 pp.
Lu et al., "Adsorption behavior and mechanism of perfluorooctane sulfonate on nanosized inorganic oxides," Journal of Colloid and Interface Science, vol. 474, Jul. 2016, 7 pp.
Nangmenyi et al., "Synthesis and characterization of silver-nanoparticle-impregnated fiberglass and utility in water disinfection," Nanotechnology, vol. 20, No. 49, Nov. 2009, 10 pp.

(56) References Cited

OTHER PUBLICATIONS

Nguyen et al., "Iron Coated Sponge in Arsenic Removal," Fluid/Particle Separation Journal, vol. 16, No. 2, 2004, 9 pp. (Applicant points out, in accordance with MPEP 609.04(a), that the year of publication, 2004, is sufficiently earlier than the effective U.S. filing date, so that the particular month of publication is not in issue.).
Nguyen et al., "Iron-Coated Sponge as Effective Media to Remove Arsenic from Drinking Water,", Water Quality Research Journal of Canada, vol. 41, No. 2, May 2006, 7 pp.
Pelley, J., "Taming Toxic Algae Blooms," American Chemical Society Central Science, vol. 2, May 2016, 4 pp.
Van Embden et al., "The Heat-Up Synthesis of Colloidal Nanocrystals," Chemistry of Materials, vol. 27, No. 7, Feb. 2015, 40 pp.
Wilfert et al., "The Relevance of Phosphorus and Iron Chemistry to the Recovery of Phosphorus from Wastewater: A Review," Environmental Science & Technology, vol. 49, No. 16, May 2015, 15 pp.
Xiao et al., "β-Cyclodextrin Polymer Network Sequesters Perfluorooctanoic Acid at Environmentally Relevant Concentrations," Journal of the American Chemical Society, vol. 139, No. 23, May 2017, 5 pp.
Zhang et al., "Effect of Ferric and Ferrous Iron Addition on Phosphorus Removal and Fouling in Submerged Membrane Bioreactors," Water Research, vol. 69, Feb. 2015, 13 pp.
Final Program and Abstract Book, Minnesota Water Resources Conference, Oct. 2017, 62 pp.
Communication Pursuant to Rules 161(2) and 162 EPC from counterpart European Application No. 18770429.1, dated Oct. 31, 2019, 3 pp.
Response to Communication Pursuant to Rules 161(2) and 162 EPC from counterpart European Application No. 18770429.1, dated Oct. 31, 2019, filed Apr. 30, 2020, 10 pp.
International Preliminary Report on Patentability from International Application No. PCT/US2018/024100, mailed Oct. 3, 2019, 12 pp.
International Search Report and Written Opinion from International Application No. PCT/US2018/024100, mailed Jul. 25, 2018, 15 pp.
Ahmed, S et al. "A Nanoselenium Sponge for Instantaincous Mercury Removal to Undetectable Levels" Advanced Functional Materials, vol. 27, No. 17, Mar. 6, 2017 (11 pages).
Brockgreitens, J.W. et al. "Versatile Process for the Preparation of Nanocomposite Sorbents: Phosphorus" Environmental Science & Technology, vol. 54, No. 14, Jun. 15, 2020 (pp. 9034-9043).

\* cited by examiner

POROUS NANOCOMPOSITES

RELATED APPLICATIONS

This application is a National Stage application under 35 U.S.C. § 371 of PCT Application No. PCT/US2018/024100, entitled "POROUS NANOCOMPOSITES" and filed on Mar. 23, 2018, which claims the benefit of U.S. Provisional Patent Application No. 62/476,166, titled "POROUS NANOCOMPOSITES SORBENTS FOR MULTIPOLLUTANT CAPTURE" and filed Mar. 24, 2017. The entire contents of application nos. PCT/US2018/024100 and 62/476,166 are incorporated herein by reference.

TECHNICAL FIELD

The present application relates generally to porous nanocomposites and methods of making and using the same.

BACKGROUND

Pollutants can be found in various fluid mediums. Removal of pollutants can be desirable for numerous reasons. However, challenges in removing pollutants include cost of manufacturing devices to remove the pollutants and efficiency of those devices.

SUMMARY

An article according to the present disclosure includes a porous scaffold structure that includes a plurality of supports. The article further includes a plurality of metallic or non-metallic nanomaterials disposed on at least one of the supports. Each of the plurality of metallic or non-metallic nanomaterials is directly bound to at least one of the supports.

The present disclosure further includes a system for removing a pollutant from a fluid medium. The system includes an article at least partially disposed within the fluid medium. The article includes a porous scaffold structure that includes a plurality of supports. The article further includes a plurality of metallic or non-metallic nanomaterials disposed on at least one of the supports. Each of the plurality of metallic or non-metallic nanomaterials is directly bound to at least one of the supports.

The present disclosure further includes a method of making a porous nanocomposite. The method includes at least partially immersing a porous article in a fluid medium. The fluid medium includes one or more non-metals, metals, metal salts, metal acids, or mixtures thereof. The method further includes heating the porous article to reduce the one or more non-metals, metals, metal salts, metal acids, or mixtures thereof. The method further includes forming a plurality of metal or non-metal nanomaterials on the porous article from the one or more non-metals, metals, metal salts, metal acids, or mixtures thereof.

There are several advantages to using the disclosed articles, systems and methods, some of which are unexpected. For example, according to various embodiments of the present disclosure, porous articles such as sponge can be used to absorb a fluid and form metallic or non-metallic nanomaterials thereon. According to various embodiments, metal ions in the fluid are able to diffuse into the sponge material where they are supported and stabilized by the matrix of the sponge. Upon heating, small particles form both on the surface and within the fibers of the sponge. Without the support structure, the particles would form agglomerates that do not have the same desired properties as the small particles, namely lower reactivity with pollutant species. The resulting porous nanocomposite articles described herein may be used for a variety of applications including pollutant removal, chemical synthesis and catalysis, anti-fouling, and the like.

The details of one or more examples are set forth in the accompanying drawings and the description below. Other features, objects, and advantages of the disclosure will be apparent from the description and drawings, and from the claims.

BRIEF DESCRIPTION OF DRAWINGS

The drawings illustrate generally, by way of example, but not by way of limitation, the various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

According to various examples of the present disclosure, a porous nanocomposite article can include a porous scaffold structure that includes a plurality of supports therein. A plurality of metallic or non-metallic nanomaterials is disposed on at least one of the supports.

The porous scaffold structure can be formed from many suitable materials or combinations of materials. As non-limiting examples of suitable materials, the porous scaffold structure can be formed from an organic material or an inorganic material. The organic material or inorganic material can include a resin, a metal, glass, a ceramic, a silicon, activated carbon, textiles, or a combination thereof. For example, a textile may include a plurality of tows as supports, a sponge may include a plurality of fibers as supports, and a ceramic may include a plurality of fibers or material between pores as supports.

In some examples, the porous scaffold structure may be formed by granular porous materials. For example, granules of porous material, representing a support of the porous scaffold structure, may be held together to form the porous scaffold structure. A variety of granular porous materials may be used including, but not limited to, activated carbon, polymer beads, silica sand, zirconia, alumina, anthracite, and the like.

Figure 1:
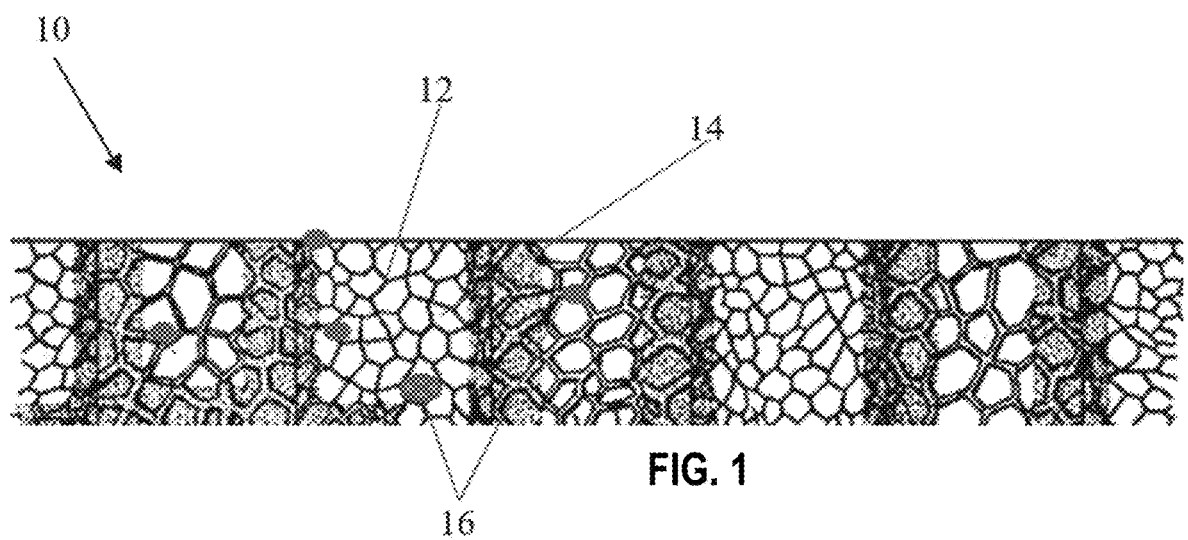
FIG. 1 is a sectional view of a sponge, in accordance with various embodiments.

While the porous scaffold structure can assume many suitable structures, a non-limiting example is a sponge. A sponge can include soft, porous materials that are marked by their ability to strongly absorb and retain fluids. An example of a sponge is illustrated in FIG. 1, which is a sectional view sponge 10. As shown in FIG. 1, sponge 10 includes fiber 12. Fiber 12, in part, form pore 14 in sponge. As shown, pore 14 has a size (e.g., diameter) of about 100 nanometers. In other examples, the size of pore 14 in sponge 10, or any other structure, can be in a range from about 50 nanometers to about 500 nanometers, about 150 nanometers to about 450 nanometers, about 200 nanometers to about 400 nanometers, or about 250 nanometers to about 350 nanometers. Each pore 14 can be the same size or a different size. Pore 14 can extend partially or entirely through sponge 10.

As illustrated in FIG. 1, pore 14 of sponge 10 has a relatively large surface area to the volume of sponge 10. The relatively large surface area of pore 14 exposes a corresponding large surface area of metallic or non-metallic nanomaterial, disposed on the surface of pore 14, to a fluid medium infiltrating sponge 10. For example, sponge 10 may have a relatively high surface area to volume ratio compared to a substrate that does not include pore 14. Additionally or alternatively, pore 14 may allow for greater transfer of a fluid medium into sponge 10, such that metallic or non-metallic nanomaterials on a surface of fiber 12 or in a bulk matrix of fiber 12 may have a higher rate of infiltration of the fluid medium into sponge 10. In some examples, pore 14 may be greater than 100 nm.

In sponge 10, each of the scaffolds or supports are formed by fiber 12. Fiber 12 can be formed from the same material as sponge 10. In some examples sponge 10 is formed entirely by fiber 12. There are many suitable materials that fiber 12 can include. In some examples fiber 12 include one or more polymers. Examples of suitable polymers include polyurethane, cellulose, polyamide, polystyrene, polyethylene, polyethylene terephthalate, polypropylene copolymers thereof, or mixtures thereof.

As illustrated in FIG. 1, sponge 10 further includes metallic or non-metallic nanomaterial 16 disposed on fiber 12. Metallic or non-metallic nanomaterial 16 can be disposed on fibers 12 located on the exterior and interior of sponge 10. Metallic or non-metallic nanomaterial 16 has a size (e.g., diameter) in the nanometer range. For example, while not so limited, a diameter of the nanomaterial can range from about 10 nanometers to about 500 nanometers, about 20 nanometers, to about 200 nanometers, about 30 nanometers to about 100 nanometers, or about 40 nanometers to about 50 nanometers. Each of metallic or non-metallic nanomaterials 16 can be the same size or a different size.

While FIG. 1 has been described with respect to sponge 10, in some examples the porous scaffold structure may be a rigid porous structure, such as a porous ceramic. For example, while sponge 10 may absorb a fluid medium through a change in volume (i.e. compression), the porous ceramic may remain substantially rigid while receiving a flow of the fluid medium without a change in volume. Such porous ceramics may be useful for, for example, fixed bed purification systems involving high flows of the fluid medium.

The metallic or non-metallic nanomaterial may have a variety of shapes, such as nanospheres, nanofilms, nanorods, nanowires, nanostars, nanodomes, and the like. In some examples, at least a portion of a surface of the plurality of metallic or non-metallic nanomaterials conforms to a surface of a support of the porous scaffold structure. For example, as explained below, a metallic or non-metallic nanomaterial may be formed on a support of the porous scaffold structure, such that growth of at least a portion of the metallic or non-metallic nanomaterial may occur along an interior or exterior surface of the porous scaffold structure, which may result in a metallic or non-metallic nanoparticle having a surface that conforms to a surface of the support.

In some examples, each of the plurality of metallic or non-metallic nanomaterials may be disposed on or in at least one support of the plurality of supports of the porous scaffold structure. For example, as will be explained further below, the plurality of metallic or non-metallic nanomaterials may be formed from metal ions in solution. Prior to formation of the metallic or non-metallic nanomaterials, these metal ions may diffuse into and around the supports of the porous scaffold structure. As a result of this high dispersion of constituent metal ions throughout the porous scaffold structure, the resulting metallic or non-metallic nanomaterials may be (1) disposed on a support on an exterior surface of the porous scaffold structure (i.e. disposed on a surface of a support on a surface of the bulk matrix of the porous scaffold structure), (2) disposed on a support on an interior surface of the porous structure (i.e. a surface of a support within a bulk matrix of the porous scaffold structure), and/or (3) disposed within a support of the porous scaffold structure (i.e. within a matrix of a support).

Due to this high dispersion, a given volume of the porous nanocomposite articles described herein may have a greater number of metallic or non-metallic nanomaterials, a greater concentration of metallic or non-metallic nanomaterials, a more even distribution of metallic or non-metallic nanomaterials, and/or a greater adhesion of metallic or non-metallic nanomaterials to the supports as compared to metallic or non-metallic nanocomposites that do not form metallic or non-metallic nanomaterials from a dispersed metal ion solution. For example, metal ions are not limited to a surface of the plurality of supports, allowing for a greater number of nanomaterials to be formed in a given volume and resulting in a higher pollutant removal rate (see, for example, FIGS. 5A-C). As another example, nanomaterials disposed on interior surfaces of supports or within the supports of the porous scaffold structure may be entrapped, which may increase adhesion and reduce leaching of the nanomaterials from the porous nanocomposite articles.

The plurality of supports may include any structure of the porous scaffold structure that supports the plurality of metallic or non-metallic nanomaterials. In some examples, the plurality of supports of the porous scaffold structure may include binding sites and/or nucleation sites, such as on a surface or in a bulk material of the porous scaffold structure, that encourage bonding, nucleation, and/or adhesion of the plurality of metallic or non-metallic nanomaterials to a surface of the plurality of supports of the porous scaffold structure. For example, the plurality of supports may include various functional groups that bind to constituent metal ions of the metallic or non-metallic nanomaterials prior to thermal reduction of the metallic or non-metallic nanomaterials and formation of the metallic or non-metallic nanomaterials, as will be described later.

By providing binding sites and/or nucleation sites, the plurality of supports of the porous scaffold structure may encourage metallic or non-metallic nanomaterial growth that directly binds to and/or conforms to the surface of the supports of the porous scaffold structure. This greater binding and/or conformity may reduce leaching of the metallic or non-metallic nanomaterials from the porous scaffold structure. In some examples, the metallic or non-metallic nanomaterials are formed from compounds having functional groups, such as monomers having hydroxide functional groups, while in other examples, a surface of the porous scaffold structure is functionalized, such as through pretreatment. In some examples, the materials or materials of the porous scaffold structure have an affinity for the constituent metal or metalloid ions of the constituent metallic or non-metallic nanomaterial.

The metallic or non-metallic nanomaterial may be directly bound to a support of the porous scaffold structure. The metallic or non-metallic nanomaterial may be directly bound to an interior or exterior of the plurality of supports in a variety of ways including, but not limited to: intramolecular bonding, such as metallic or non-metallic bonding, ionic bonding, and covalent bonding; intermolecular bonding, such as dipole-dipole bonding, van der Waals bonding, hydrogen bonding; and the like.

By directly binding the metallic or non-metallic nanomaterials to the plurality of supports, the metallic or non-metallic nanomaterial may have a greater accessible surface and/or a higher adsorption rate than metallic or non-metallic nanomaterials that are bound to a substrate through a coating or other adhesive. For example, metallic or non-metallic nanomaterials that are not formed from metal ions in solution may utilize polymer shells or coatings for stabilization or adhesion, which may reduce transfer and subsequent adsorption of a pollutant to a binding site of the coated metallic or non-metallic nanomaterial. Regardless of a type of bonding, metallic or non-metallic nanomaterial 16 may have a high interface with molecules of a surface of the supports, such that the metallic or non-metallic nanomaterial may have a stronger adhesion to the surface of the supports than a same or similar metallic or non-metallic nanomaterial that has not been formed on a surface of a fiber. For example, porous nanocomposite articles discussed herein may have a nanomaterial retention of greater than 95%.

Each metallic or non-metallic nanomaterial 16 includes one or more non-metal, metals or metal oxides. In each metallic or non-metallic nanomaterial 16, the one or more metals or non-metals ranges from about 1 wt % to about 100 wt % of metallic or non-metallic nanomaterial 16, about 10 wt % to about 95 wt %, about 15 wt % to about 90 wt %, about 20 wt % to about 85 wt %, about 25 wt % to about 80 wt %, about 30 wt % to about 75 wt %, about 35 wt % to about 70 wt %, about 40 wt % to about 65 wt % about 45 wt % to about 60 wt, or about 50 wt % to about 55 wt %. While the metal or non-metal of the nanomaterial can be any suitable metal, non-limiting examples of materials include metalloids, such as silicon and boron; transition metals, such as copper, zinc, iron, nickel, manganese, silver, and titanium; post-transition metals such as aluminum; alkaline earth metals, such as calcium and magnesium; certain non-metals such as carbon and selenium; and alkali metals such as rubidium. Any one of these metals can be in elemental form or an alloy. Additionally, metallic or non-metallic nanomaterials 16 can include mixtures of the elemental metals or alloys thereof. Non-limiting examples of metal oxides that can be included in metallic nanomaterial 16 include iron oxide, cupric oxide, alumina, zinc oxide, nickel oxide, or mixtures thereof.

The porous nanocomposite articles described herein can be included in a system for substantially removing a pollutant from a fluid medium. Non-limiting examples of pollutants that can be removed include a pollutant chosen from a heavy metal such as mercury, lead, arsenic, cadmium, chromium, nutrients such as nitrate, phosphate. The Pollutant can also be an organic pollutant such as perfluorooctanoic acid (PFOA), perfluorooctanesulfonic acid, dioxin, polychlorinated biphenyls, polycyclic aromatic hydrocarbons, endocrine disrupters. The pollutant can also be a gaseous molecule such as formaldehyde, sulfur oxide, nitrous oxide, or mixtures thereof. The fluid medium can be chosen from a liquid such as water, a gas such as atmospheric air or flue gas, or a combination thereof (e.g., part of the structure is immersed in the liquid while part of the structure is exposed to air).

In operation, the fluid is absorbed through the pores of the porous scaffold structure. As the fluid is absorbed, the pollutants can interact with the metallic or non-metallic nanomaterials. As non-limiting examples, this interaction can lead to a chemical change in the pollutant (e.g., the pollutant can be changed in oxidation state or charge to a less harmful analogue) or the pollutant can react with the metallic or non-metallic nanomaterial and be held on the nanomaterial. In either of these non-limiting examples, the result is that the pollutant is effectively removed from the fluid. The degree to which all pollutants in the fluid are fully removed can be in a range from about 50 wt % to about 100 wt %, about 55 wt % to about 100 wt %, about 60 wt % to about 100 wt %, about 65 wt % to about 100 wt %, about 70 wt % to about 100 wt %, about 75 wt % to about 100 wt %, about 80 wt % to about 100 wt %, about 85 wt % to about 100 wt %, about 90 wt % to about 100 wt %, or about 95 wt % to about 100 wt %.

The system can be located in many suitable environments where removal of pollutants can be desirable. As non-limiting examples, the system can be located in a centralized sewage system or a subsurface sewage treatment system, a household water system, in large body of water, a stream, a tributary or industrial water treatment process.

In some examples, the metal or metal oxide of the metallic or non-metallic nanomaterial can be chosen to interact with a particular pollutant. As a non-limiting example, metallic or non-metallic nanomaterials including selenium can interact with pollutants such as mercury or lead. As a further non-limiting example, metallic or non-metallic nanomaterials including copper can interact with pollutants such as arsenic. As a further non-limiting example, metallic or non-metallic nanomaterials including iron can interact with pollutants such as arsenic or phosphate.

As described above, the metallic or non-metallic nanomaterial may be selected for an affinity of the metal or metal oxide of the metallic or non-metallic nanomaterial to the particular pollutant. The metallic or non-metallic nanomaterial may exhibit a maximal load or removal capacity of the particular pollutant of, for example, greater than 100 milligrams of the pollutant per gram of the metal nanomaterial. The maximal load or removal capacity may be expressed by the following Equation 1:

$$Q_e = \frac{C_i - C_f}{m} \times V \quad \text{[Equation 1]}$$

In the above Equation 1, $Q_e$ represent the amount (mg) of pollutant adsorbed per gram of metal nanomaterial at equilibrium (mg/g), $C_i$ represents the initial concentration of the pollutant in the solution (mg/L), $C_f$ represents the final concentration of pollutant in the solution (mg/L), m is the mass of metal nanomaterial (g), and V is the volume of the solution (L).

In some examples, the porous nanocomposite articles discussed herein may also be used for catalysis or chemical synthesis. For example, the metallic or non-metallic nanomaterial of the porous nanocomposite article may include zinc, titanium, manganese, or other metal or non-metal capable of facilitating a chemical reaction. The porous nanocomposite article may be part of a reactor, such as a packed bed reactor, and a fluid stream, such as a liquid or gaseous stream, containing reactants may be passed through the reactor. The high dispersion, surface area, and adsorption capacity of the porous nanocomposite article may result in higher reaction rates than porous metallic or non-metallic catalysts that do not form metallic or non-metallic nanomaterials from solution on the porous scaffold structure.

In some examples, the porous nanocomposite articles discussed herein may also be used for water desalination. For example, the metallic and/or non-metallic nanomaterial of the porous nanocomposite article may include manganese, aluminum, or other metal or non-metal capable of removing salts from a salt water stream. The porous nanocomposite article may be part of a water desalination plant and a salt water stream may be passed through the porous nanocomposite article. The high dispersion, surface area, and adsorption capacity of the porous nanocomposite article may result in higher salt removal rates than porous metallic or non-metallic desalination materials that do not form metallic or non-metallic nanomaterials from solution on the porous scaffold structure.

Figure 2:
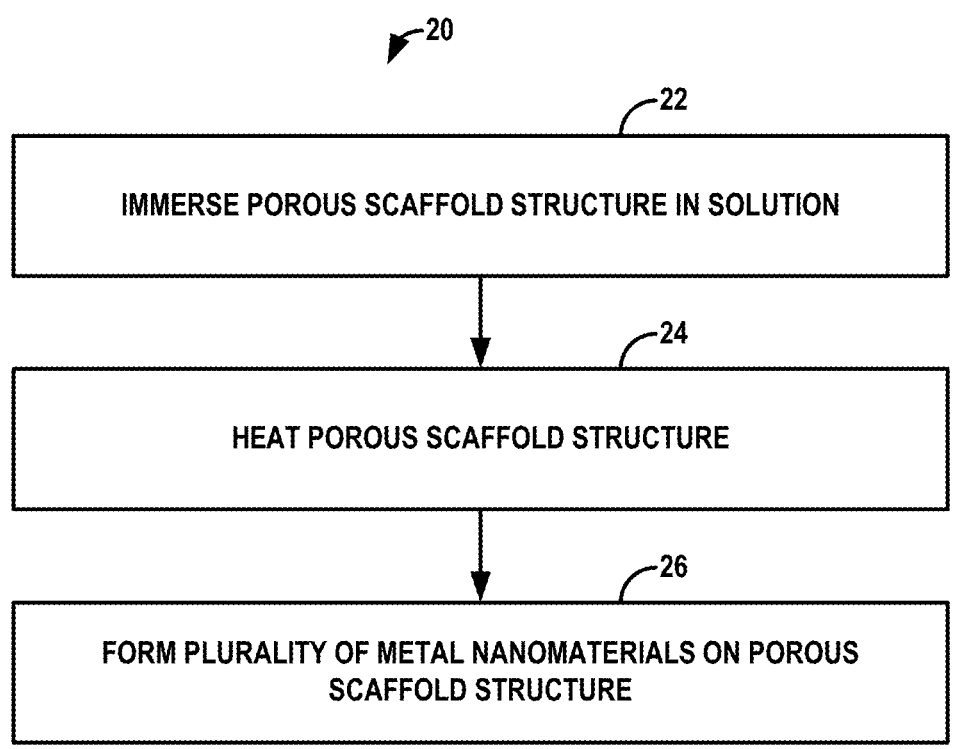
FIG. 2 is a flow chart illustrating a method of making a porous nanocomposite, in accordance with various embodiments.

In some examples, the porous nanocomposite articles discussed herein may also be used for anti-fouling or anti-microbial materials or surfaces, such as in filtration or clothing. For example, the metallic and/or non-metallic nanomaterial of the porous nanocomposite article may include silver, copper, or other antimicrobial material. In some examples, the porous nanocomposite article may be part of a filtration system and a fluid stream that includes microbes or particulates may be passed through the porous nanocomposite article. The high dispersion, surface area, and adsorption capacity of the porous nanocomposite article may result in higher microbe lysis and/or inhibition than porous metallic or non-metallic antimicrobial or anti-fouling materials that do not form metallic or non-metallic nanomaterials from solution on the porous scaffold structure. In some examples, the porous nanocomposite article may be a textile, such as an item of clothing. A surface of the textile may include a high dispersion and surface area of metal or non-metal nanomaterials, which may result in a higher antimicrobial activity than porous metallic or non-metallic antimicrobial materials that do not form metallic or non-metallic nanomaterials from solution on the porous scaffold structure FIG. 2 is a flow chart illustrating a method 20 for making a porous nanocomposite. Method 20 includes at least partially immersing a porous article (e.g., sponge 10) in a solution (22). The solution includes the metals or non-metals that ultimately form the metallic or non-metallic nanomaterials. While not so limited, the solution can include one or more non-metal, metals, metal salts, metal acids, or mixtures thereof. While the article is immersed in the solution, sorption of the one or more non-metals, metals, metal salts, metal acids, or mixtures thereof, occurs within the bulk matrix of the article (e.g., between or within sponge fibers 12). The article can be immersed in the fluid for any suitable amount of time. As non-limiting examples, the article can be immersed in the fluid for a time ranging from about 1 minute to about 24 hours, about 30 minutes to about 20 hours, about 1 hour to about 15 hours, about 5 hours to about 12 hours, or about 10 hours to about 11 hours. The ready sorption of the solution can help to achieve a substantially uniform distribution of the metal throughout the article such that eventually the metal nanomaterials are formed on at least one of an external and internal surface of the porous article.

A variety of non-metals, metals, metal salts, and/or metal acids may be used including, but not limited to, ferrous sulfate heptahydrate, copper (II) chloride, selenous acid, ammonium aluminum sulfate, nickel (II) sulfate, zinc nitrate hexahydrate, titanium sulfate hydrate, or combinations thereof. In some examples, the one or more non-metals, metals, metal salts, metal acids, or combinations thereof, may have a concentration between about 0.001 M and about 5 M. For example, if a concentration of the metals, metal salts, and/or metal acids is too high or too low, such as greater than about 5 M or less than about 0.001, the resulting metallic or non-metallic nanomaterials may have a lower surface area than a concentration between about 0.001 and about 5 M, as the metallic or non-metallic nanomaterials may be either too compact or too dispersed. In some examples, the solution has a pH between about 2 and about 9. For example, a pH lower than 2 or higher than 9 may have a lower solubility of the non-metals, metals, metal salts, and/or metal acids.

Method 20 includes heating the porous article (24). The porous article can be heated while immersed in the solution or after being removed from the solution. The porous article is heated to reduce the one or more non-metals, metals, metal salts, metal acids, or mixtures thereof, and ultimately form the metallic or non-metallic nanomaterials. The porous article can be heated at any suitable temperature. As a non-limiting example, a suitable temperature can be in a range from about 100° C. to about 500° C., about 150° C. to about 450° C., about 200° C. to about 400° C., or about 250° C. to about 350° C.

As the porous article is heated, metallic or non-metallic nanomaterial growth is accomplished through reduction. Reduction is the gain of electrons by a chemical species. In the metallic or non-metallic nanomaterial formation, reduction is used to reduce ionic metal or metal oxide species into neutral, metallic, or non-metallic form yielding solid structures that have different properties than the dissolved species. This type of reduction is thermal reduction. This differs from other reduction techniques, which are dependent on chemical reduction agents. While not intending to be bound by any theory it is believed that heating causes water to be evaporated from the porous article thereby forcing the metal ions together while at the same time reducing these ions to metallic or non-metallic particles. After the water is substantially removed and the metal ions are forced together, the metallic or non-metallic nanomaterials are formed (26).

Figure 3A:
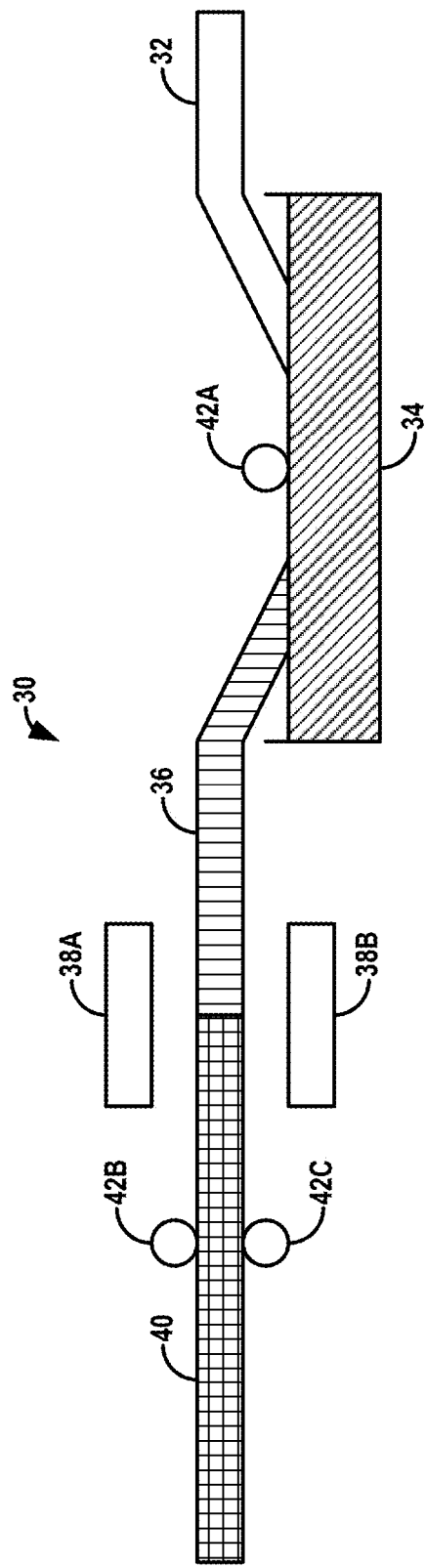
FIG. 3A is an example diagram illustrating a system 30 for producing flexible metal and/or non-metal nanocomposite articles 40 from a flexible porous scaffold structure 32.

FIG. 3A is an example diagram illustrating a system 30 for producing flexible metal and/or non-metal nanocomposite articles 40 from a flexible porous scaffold structure 32. System 30 includes a metal or non-metal ion application system that includes an ion bath 34, heating elements 38A and 38B (referred to collectively as "heating elements 38"), and process control elements 42A, 42B, and 42C (referred to collectively as "process control elements 42").

In the example of FIG. 3A, flexible porous scaffold structure 32, such as a sponge, may be immersed, such as by soaking, into ion bath 34, such as for about 10 minutes to about 60 minutes. Ion bath 34 includes metal and/or non-metal ions, such as at a concentration of between about 0.001 M and about 5 M, in solution, such as having a pH between about 2 and about 9. Ions from ion bath 34 may infiltrate pores and supports of flexible porous scaffold structure 32 to form an ion infiltrated scaffold structure 36. Ion infiltrated scaffold structure 36 may be heated, such as to greater than 100° C., by heating elements 38, such as from about 1 hour to about 8 or 12 hours. As ion infiltrated scaffold structure 36 is heated, the metal and/or non-metal ions undergo thermal reduction to form a plurality of metal and/or non-metal nanomaterials on surfaces of and within supports of the flexible porous scaffold structure, thereby forming flexible metal and/or non-metal nanocomposite article 40. Process control elements 42 may include any equipment for moving any of flexible porous scaffold structure 32, ion-infiltrated scaffold structure 36, and/or flexible metal and/or non-metal nanocomposite article 40 through system 30, such as conveyer belts, rollers, and the like.

Figure 3B:
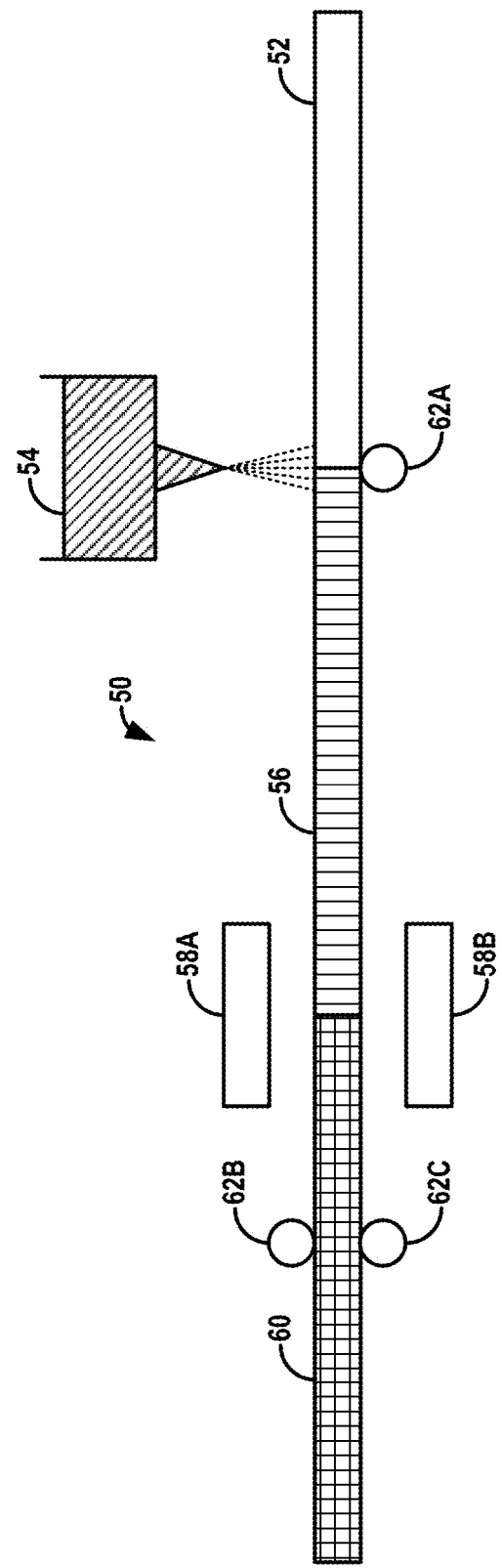
FIG. 3B is an example diagram illustrating a system 50 for producing rigid metal and non-metal nanocomposite articles 60 from a rigid porous scaffold structure 52.

FIG. 3B is an example diagram illustrating a system 50 for producing rigid metal and non-metal nanocomposite articles 60 from a rigid porous scaffold structure 52. System 50 includes a metal and/or non-metal ion application system that includes an ion applicator 54, heating elements 58A and 58B (referred to collectively as "heating elements 58"), and process control elements 62A, 62B, and 62C (referred to collectively as "process control elements 62").

In the example of FIG. 3B, rigid porous scaffold structure 52, such as a porous ceramic, may be immersed, such as by spraying, by ion applicator 54, such as for about 10 minutes to about 60 minutes. Ion applicator 54 includes metal and/or non-metal ions, such as at a concentration of between about 0.001 M and about 5 M, in solution, such as having a pH between about 2 and about 9. Ions from ion applicator 54 may infiltrate pores and supports of rigid porous scaffold structure 52 to form an ion infiltrated scaffold structure 56. Ion infiltrated scaffold structure 56 may be heated, such as to greater than 100° C., by heating elements 58, such as from about 1 hour to about 8 or 12 hours. As ion infiltrated scaffold structure 56 is heated, the metal and/or non-metal ions undergo thermal reduction to form a plurality of metal and/or non-metal nanomaterials on surfaces of and within supports of the rigid porous scaffold structure, thereby forming rigid metal and/or non-metal nanocomposite article 60. Process control elements 62 may include any equipment for moving any of rigid porous scaffold structure 52, ion-infiltrated scaffold structure 56, and/or rigid metal and/or non-metal nanocomposite article 60 through system 50, such as conveyer belts, rollers, and the like.

EXAMPLES

Various embodiments of the present disclosure can be better understood by reference to the following Examples which are offered by way of illustration. The present disclosure is not limited to the Examples given herein.

Manufacture of Selenium, Iron, and Copper Nanoparticle Sponges

In an example, metal salt or acid precursors such of iron sulfate heptahydrate, iron chloride, selenous acid, and copper chloride can be dissolved in solution. Sponge materials formed from polyurethane, cellulose, polystyrene, polyethylene terephthalate, polypropylene or polyamide can be then immersed into the solution for a period of time to allow for the metal ions to dissociate into the sponge.

Figure 4A:
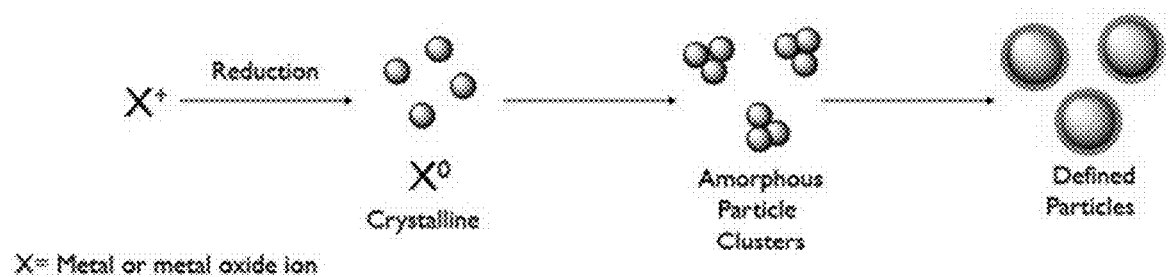
FIG. 4A is a schematic depiction of nanomaterial reduction of and particle growth on polyurethane supports, in accordance with various embodiments.
Figure 4B:
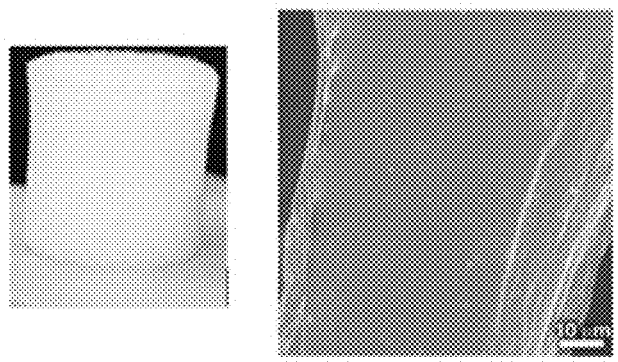
FIG. 4B is a photograph and micrograph of a polyurethane sponge, in accordance with various embodiments.
Figure 4C:
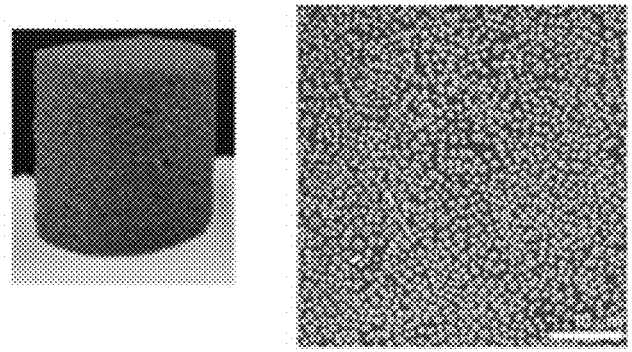
FIG. 4C is a photograph and micrograph of an iron nanoparticle sorbent, in accordance with various embodiments.

Next, the sponges can be placed in a standard convection oven or vacuum oven at temperatures greater than 100° C. By placing the sponges in the oven, water can be evaporated from the sponge thereby forcing the metal ions together while at the same time reducing these ions to metallic or non-metallic particles. This is shown schematically in FIG. 4A, which is a scheme of nanomaterial reduction of and particle growth on polyurethane supports. Sponges can be either placed in the oven while still suspended in the ion precursor solution or saturated sponges can be removed from the ion solution and placed in the oven. Heating the sponge in solution in the oven allowed for greater particle growth as reduction occurred both on the sponge support and in solution. FIG. 4B is a photograph and micrograph of a polyurethane sponge, in accordance with various embodiments. FIG. 4C is a photograph and micrograph of an iron nanoparticle sorbent, in accordance with various embodiments.

Figure 5:
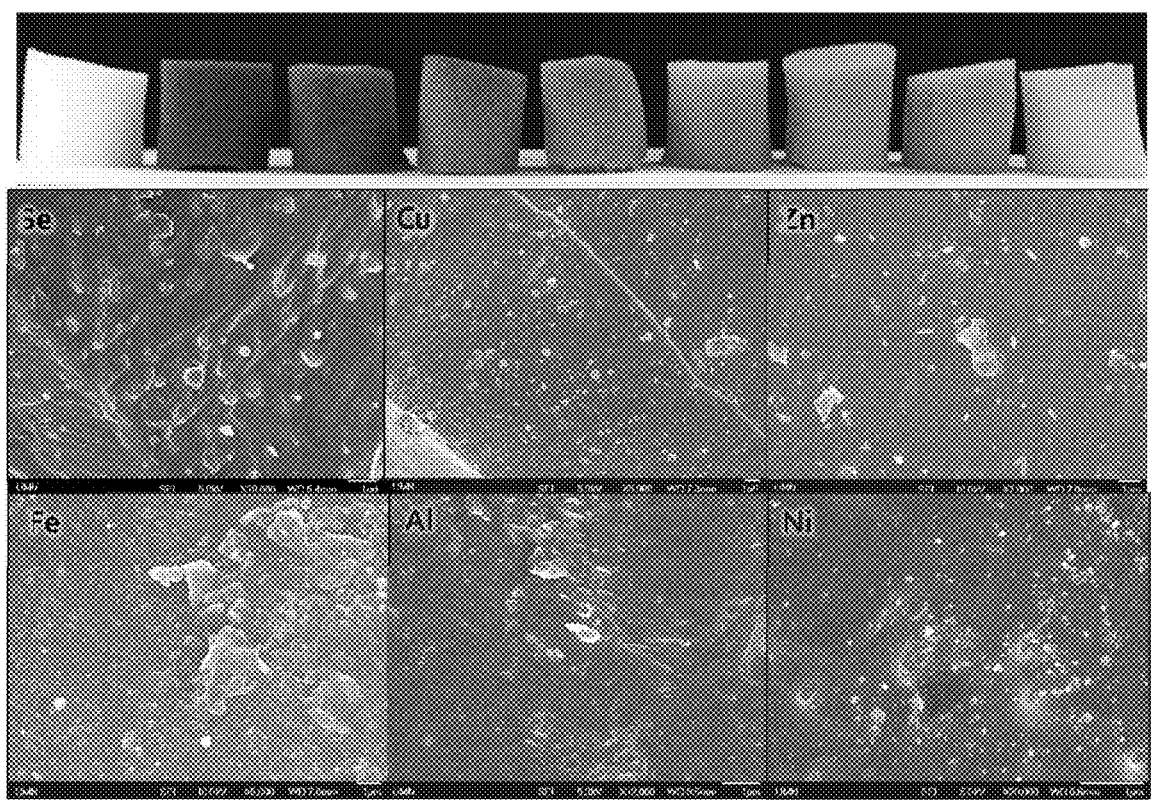
FIG. 5 shows photographs of polyurethane (PU) sponges after thermal reduction with various metal ion precursors as well as scanning electron microscope (SEM) images of the surfaces of the sponges, in accordance with various embodiments.

The thermal reduction method can be applied to multiple chemical species for the synthesis of metallic or non-metallic nanomaterials, using particles of selenium (Se), iron oxide ($Fe_2O_3/Fe_3O_4$), cupric oxide (CuO), alumina ($Al_2O_3$), zinc oxide (ZnO), and nickel oxide (NiO). Other species used with this method included calcium, magnesium and titanium. This method can also be applied to all metal and metal oxide species that are known to undergo thermal reduction. FIG. 5 shows photographs of the polyurethane (PU) sponges after thermal reduction with various metal ion precursors as well as scanning electron microscope (SEM) images of the surfaces of the sponges. The images show both small particles and particle aggregates on the surface of the sponges.

The nanomaterial sponges produced can be applied to various pollutants in water samples (Table 1). First, the selenium sponge prepared with only thermal reduction performed in a similar fashion as the one synthesized with the combined chemical and thermal reduction method, captured 99% of the mercury in solution. This sponge also showed an affinity for lead (Pb). Additionally, sponges created from copper and iron can be able to capture arsenic from water. The iron sponge can also be used to capture inorganic phosphate in solution. These sponges can be applied in series or as composite materials for multipollutant capture in water. Using this thermal reduction method, a portfolio of sponges can be created that target a variety of major water pollutants.

TABLE 1

| Sponge Nanomaterial | Pollutant Target | Capture Efficiency (%) |
| --- | --- | --- |
| Se | Mercury (Hg) | 100% |
| Se + Polyurethane | Lead (Pb) | 100% |
| Se | Lead (Pb) | >57% |
| Cu | Arsenic (As) | >91% |
| Fe | Arsenic (As) | >61-80% |
| Fe | Phosphate ($PO_3^-$, $PO_4^-$) | >98% |
| Polyurethane with any metal nanomaterial (less than 5%) | Perfluorooctanoic acid (PFOA) | 100% |
| Polyurethane with any metal nanomaterial (less than 5%) | Perfluorooctanesulfonic acid | 100% |

Phosphorus Removal by Iron Nanoparticle Sorbent

An iron nanoparticle sorbent having iron nanoparticles disposed on a polyurethane support was produced as described above. Performance of the iron nanoparticle sorbent was compared to a polyurethane sponge that did not include iron nanoparticles. Each of the iron nanoparticle sorbent and the polyurethane sponge were immersed in a solution containing phosphate ions and the resulting effluent analyzed.

Figure 6A:
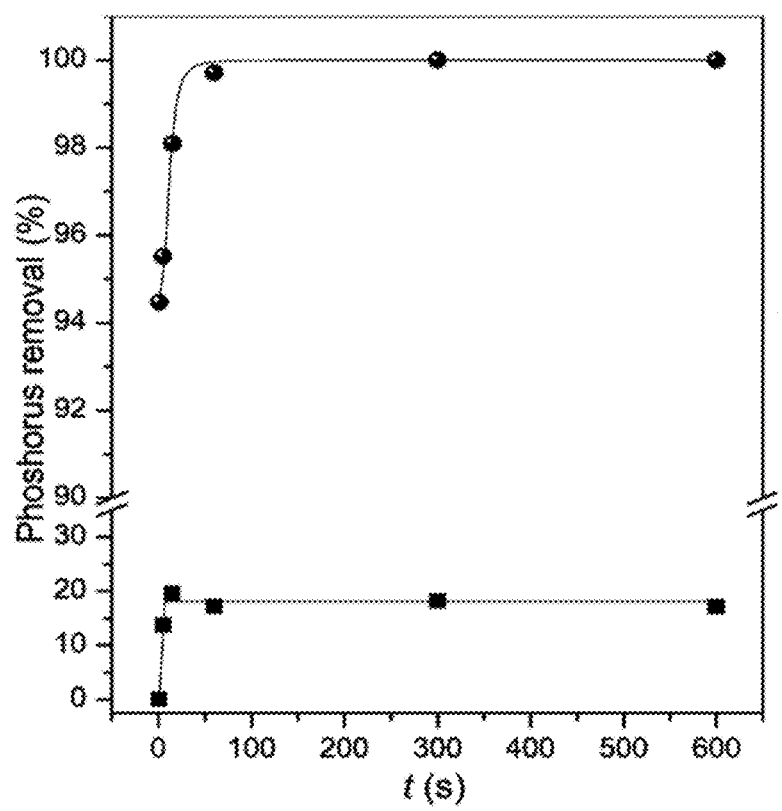
FIG. 6A is a graph illustrating phosphorus capture (%) as a function of time (s), in accordance with various embodiments.

FIG. 6A is a graph illustrating phosphorus capture (%) of the iron nanoparticle sorbent and the polyurethane sponge as a function of time (s), in accordance with various embodiments. As seen in FIG. 6A, after a short period of about 10 seconds, the iron nanoparticle sorbent was able to absorb nearly 100% of the phosphorus in the solution. In contrast, the polyurethane sponge was only able to absorb about 20% of the phosphorus in the solution.

Figure 6B:
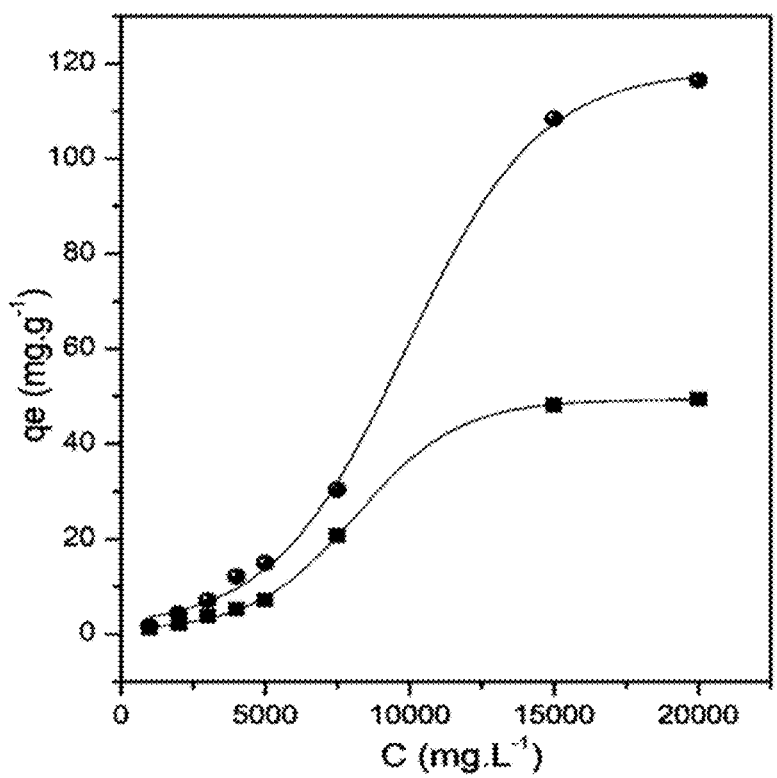
FIG. 6B is a graph illustrating phosphorus capture (%) as a function of concentration ($mg \cdot L^{-1}$), in accordance with various embodiments.

FIG. 6B is a graph illustrating phosphorus loading capacity ($mg \cdot g^{-1}$) of the iron nanoparticle sorbent and the polyurethane sponge as a function of concentration ($mg \cdot L^{-1}$), in accordance with various embodiments. As seen in FIG. 6B, the iron nanoparticle sorbent was able to absorb phosphate at a loading capacity of about 120 mg of phosphate per gram of sorbent at a loading rate of about 982.9 $g \cdot mg^{-1} \cdot min^{-1}$. In contrast, the polyurethane sponge was only able to absorb about phosphate at a loading capacity of about 50 mg of phosphate per gram of sponge.

Figure 6C:
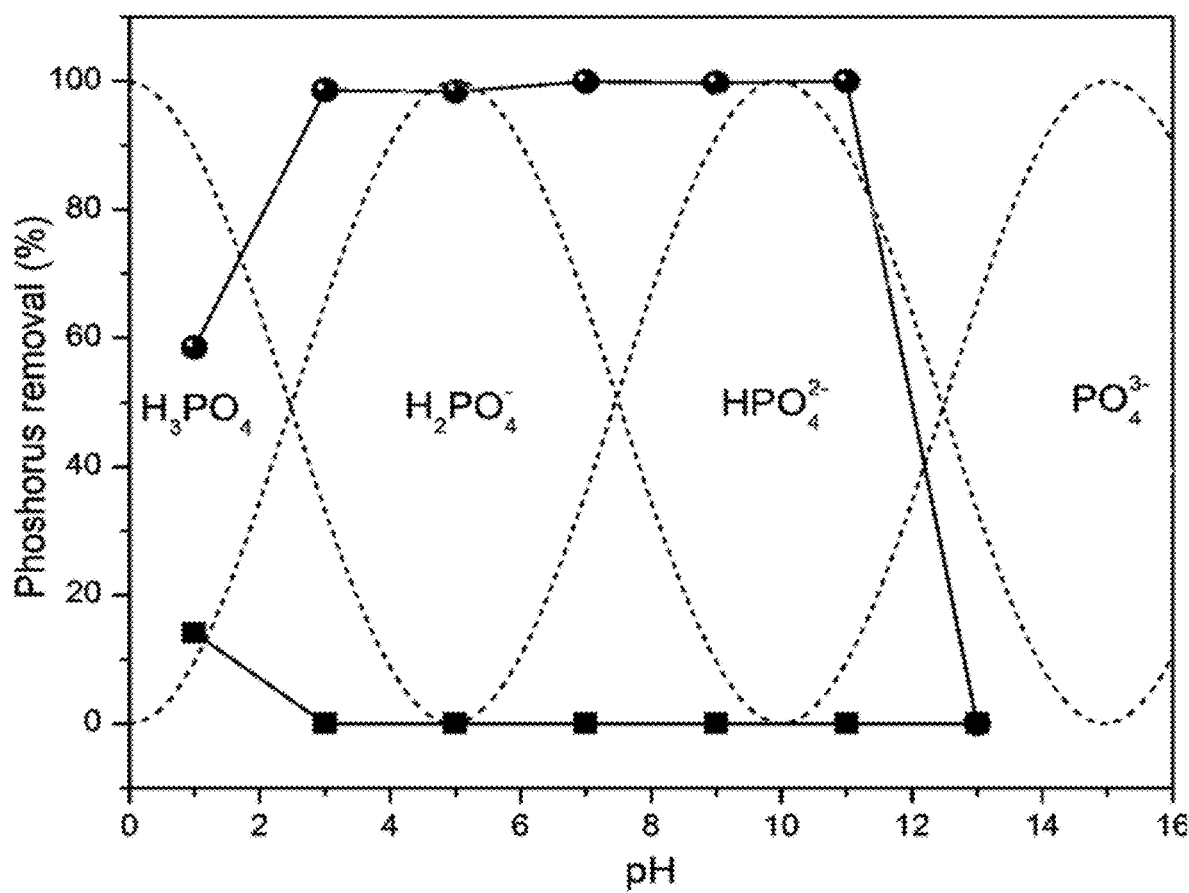
FIG. 6C is a graph illustrating phosphorus capture (%) as a function of pH, in accordance with various embodiments.

FIG. 6C is a graph illustrating phosphorus capture (%) of the iron nanoparticle sorbent and the polyurethane sponge as a function of pH, in accordance with various embodiments. As seen in FIG. 6C, the iron nanoparticle sorbent was able to absorb phosphate at pH between about 1 (~60% phosphate removal) and about 13, with nearly 100% phosphate removal at pH between about 3 and about 13. In contrast, the polyurethane sponge was only able to absorb phosphate at a pH of about 1 (~15% phosphate removal), with around 0% phosphate removal at pH between about 2 and about 13.

To test selectivity of phosphorus removal in the presence of various competing pollutants, the iron nanoparticle sorbent was immersed in a natural spring water sample and an industrial waste water sample. Concentrations of the phosphorus and various competing pollutants were measured before treatment by the iron nanoparticle sorbent (untreated) and after treatment by the iron nanoparticle sorbent (treated).

Figure 6D:
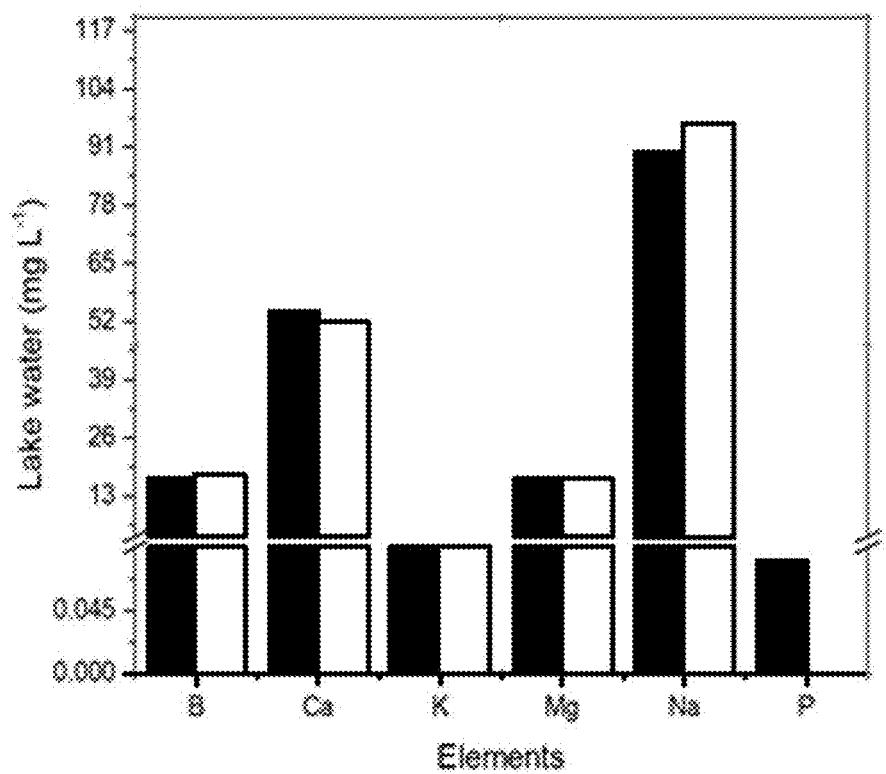
FIG. 6D is a graph illustrating concentrations ($mg \cdot L^{-1}$) of various pollutants untreated and treated lake water samples, in accordance with various embodiments.

FIG. 6D is a graph illustrating concentrations ($mg \cdot L^{-1}$) of various pollutants in untreated and treated lake water samples using an iron nanoparticle sorbent, in accordance with various embodiments. As seen in FIG. 6D, the iron nanoparticle sorbent removed phosphorus down to an undetectable level, while other ions remain at substantially the same untreated concentrations.

Figure 6E:
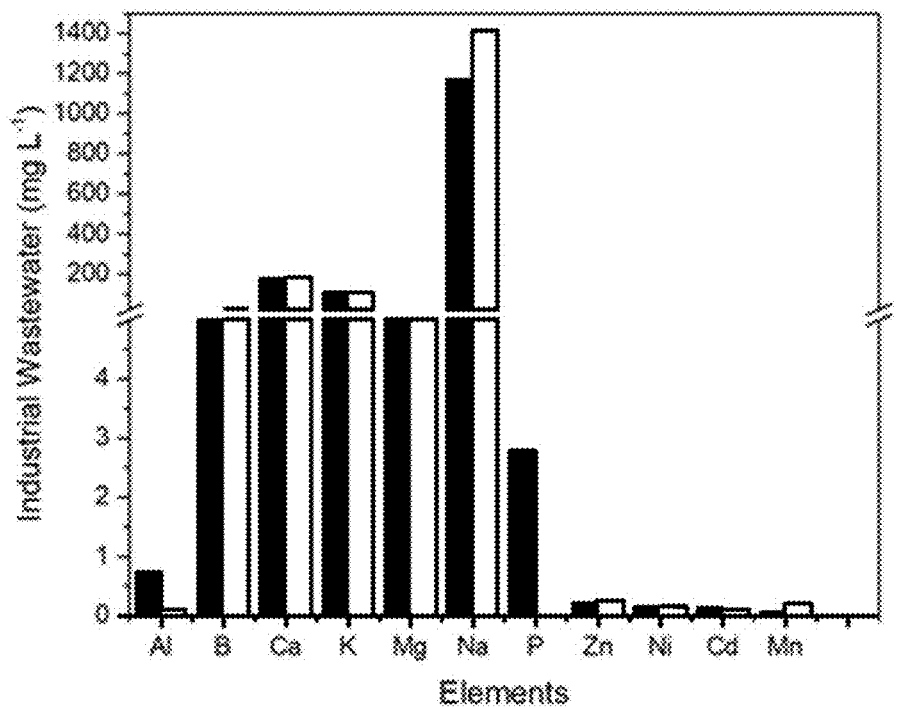
FIG. 6E is a graph illustrating concentrations ($mg \cdot L^{-1}$) of various pollutants untreated and treated waste water samples, in accordance with various embodiments.

FIG. 6E is a graph illustrating concentrations ($mg \cdot L^{-1}$) of various pollutants in untreated and treated waste water samples using an iron nanoparticle sorbent, in accordance with various embodiments. As seen in FIG. 6E, the iron nanoparticle sorbent removed phosphorus down to an undetectable level and aluminum to a low level, while other ions remain at substantially the same untreated concentration.

Arsenic Removal by Copper Nanoparticle Sorbent

A copper nanoparticle sorbent having copper nanoparticles disposed on a polyurethane support was produced as described above. Performance of the copper nanoparticle sorbent was compared to a polyurethane sponge that did not include copper nanoparticles. Each of the copper nanoparticle sorbent and the polyurethane sponge were immersed in a solution containing phosphate ions and the resulting effluent analyzed.

Figure 7A:
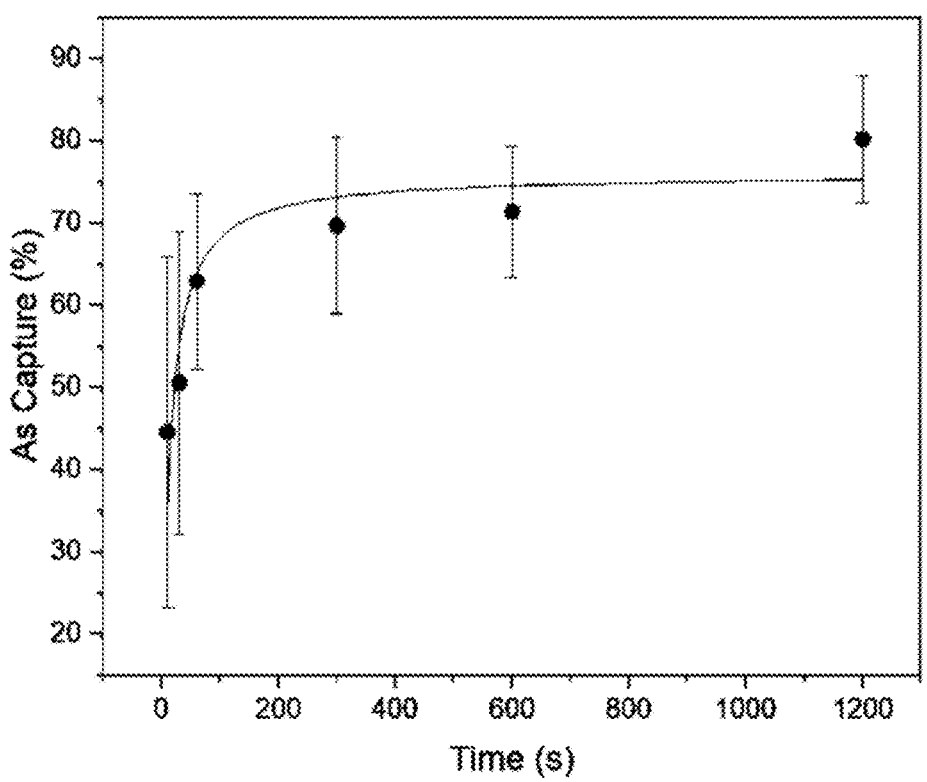
FIG. 7A is a graph illustrating arsenic capture (%) as a function of time (s), in accordance with various embodiments.

FIG. 7A is a graph illustrating arsenic capture (%) of the copper nanoparticle sorbent as a function of time (s), in accordance with various embodiments. As seen in FIG. 7A, after a short period of about 100 seconds, the copper nanoparticle sorbent was able to absorb nearly 75% of the arsenic in the solution.

Figure 7B:
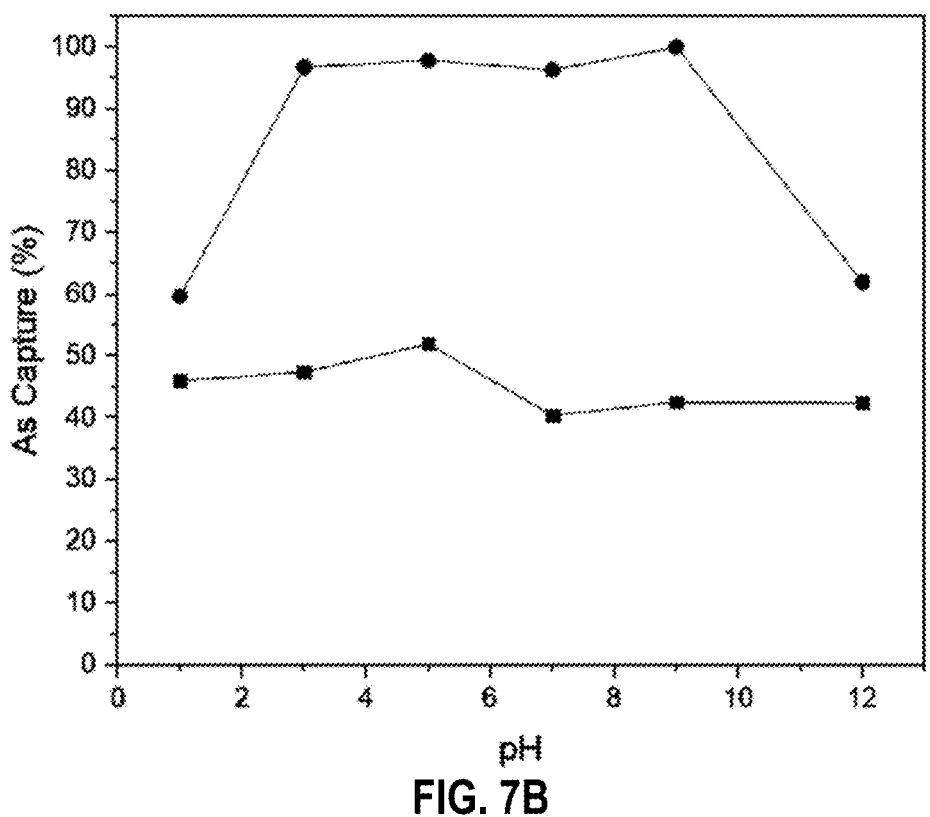
FIG. 7B is a graph illustrating arsenic capture (%) as a function of pH, in accordance with various embodiments.

FIG. 7B is a graph illustrating arsenic capture (%) of the copper nanoparticle sorbent and the polyurethane sponge as a function of pH, in accordance with various embodiments. As seen in FIG. 7B, the copper nanoparticle sorbent was able to absorb arsenic at pH between about 1 (~60% arsenic removal) and about 12 (~60% arsenic removal), with nearly 100% arsenic removal at pH between about 3 and about 9. In contrast, the polyurethane sponge was only able to absorb arsenic to about 55% at pH between about 1 and about 12.

Antimicrobial Activity of Iron Nanoparticle Material

Figure 8A:
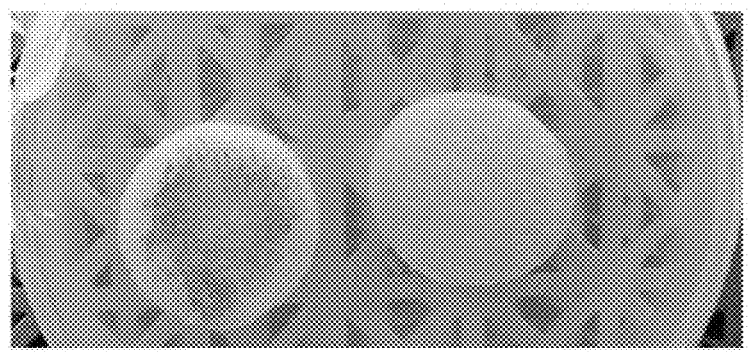
FIG. 8A is a photograph of cyanobacterial growth on iron nanoparticle material disposed on polyurethane sponge supports, in accordance with various embodiments.

Various metal nanoparticle sorbents have exhibited antimicrobial properties, which may be important for prevention of fouling in filtration, sanitation, personal care products, and apparel. FIG. 8A is a photograph of cyanobacterial growth on iron nanoparticle material disposed on polyurethane sponge supports, in accordance with various embodiments. As seen in FIG. 8A, cyanobacterial growth is present on an untreated polyurethane sponge (left), while cyanobacterial growth is substantially absent on the iron nanoparticle sorbent (right).

Figure 8B:
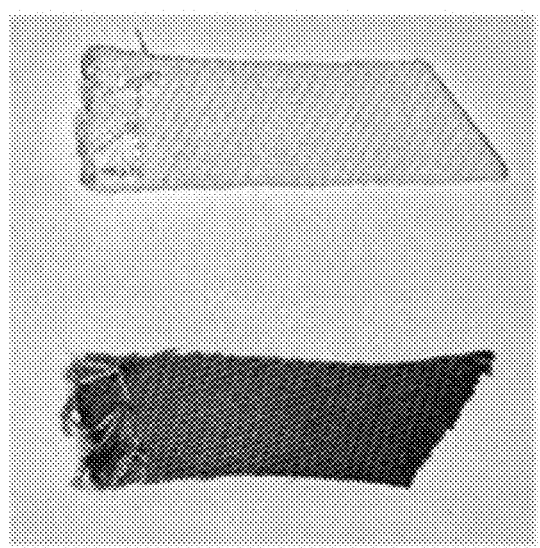
FIG. 8B is a photograph of silver particles synthesized on a garment material of 80% polyester and 20% cotton, in accordance with various embodiments.
Figure 8C:
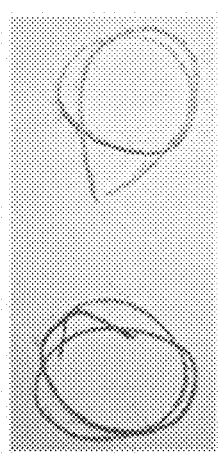
FIG. 8C is a photograph of silver particles synthesized on a thread of a garment material of 80% polyester and 20% cotton, in accordance with various embodiments.

In addition to iron nanoparticle sorbent, copper nanoparticle sorbent and silver nanoparticles. For example, silver nanoparticles have been synthesized on a fabric having 80% polyester and 20% cotton. Ionic salts of silver nitrate were dissolved in a solution, and the silver solution added to the fabric. The fabric was dried overnight and thoroughly washed. FIG. 8B is a photograph of silver particles synthesized on a garment material of 80% polyester and 20% cotton, in accordance with various embodiments. FIG. 8C is a photograph of silver particles synthesized on a thread of a garment material of 80% polyester and 20% cotton, in accordance with various embodiments.

Nanoparticles may also be impregnated into textiles, fabrics, and other materials to increase performance in areas such as wicking, temperature regulation, and material strength. Various particles, such as zinc, aluminosilicates, and other metal/metal hybrid particles may be produced using the process described above for clothing or other products.

Iron Nanoparticle Material on Ceramic Support

Figure 9A:
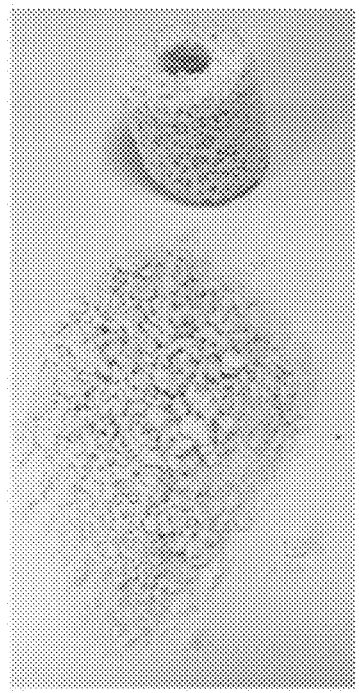
FIG. 9A is a photograph of a porous ceramic support, in accordance with various embodiments.
Figure 9B:
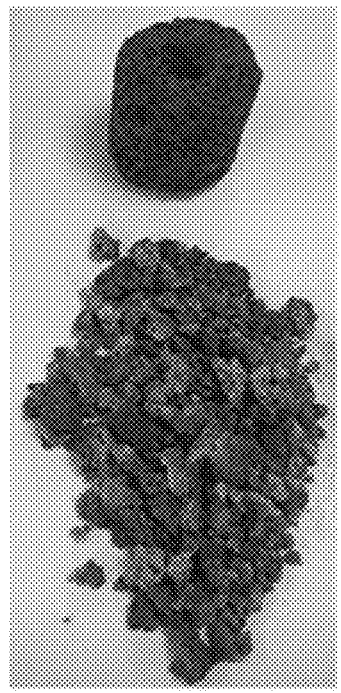
FIG. 9B is a photograph of an iron nanomaterial porous ceramic support, in accordance with various embodiments.

In addition to compressible sponges, the metallic or non-metallic nanomaterials described herein may be grown on other porous materials, including porous ceramic supports. Such porous ceramic supports may be rigid, such that they may be suitable for high flow applications and/or applications having a fixed volume. FIG. 9A is a photograph of a porous ceramic support, in accordance with various embodiments. The porous ceramic support of FIG. 9A does not include a metallic or non-metallic nanomaterial. FIG. 9B is a photograph of a selenium nanomaterial porous ceramic support, in accordance with various embodiments. The porous ceramic support of FIG. 9B includes the selenium nanomaterial. As seen in FIG. 9B, the selenium nanomaterial, indicated by the dark color, is substantially distributed throughout the porous ceramic support.

Manufacture of Iron Nanoparticle Sponge

Figure 10A:
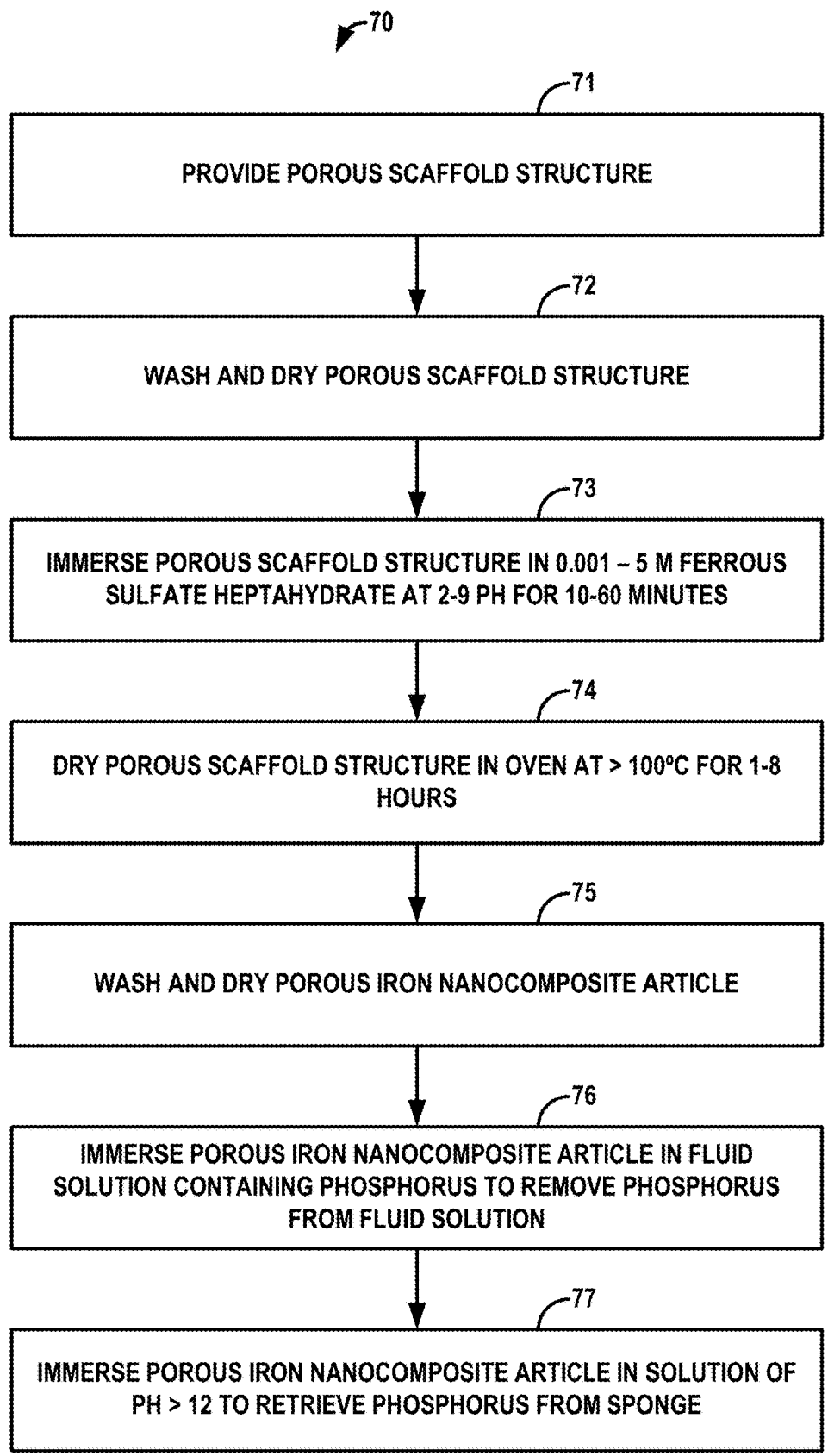
FIG. 10A is a flowchart illustrating an example method for manufacturing a porous iron nanocomposite article from ferrous sulfate heptahydrate, in accordance with various embodiments.

FIG. 10A is a flowchart illustrating an example method 30 for manufacturing a porous iron nanocomposite article from ferrous sulfate heptahydrate, removal of phosphorus using the iron nanocomposite article, and removing phosphorus from the iron nanocomposite article, in accordance with various embodiments. In the example of FIG. 10A, a porous scaffold structure, such as a polyurethane sponge, is provided (71), although other materials, including other sponges or porous scaffold structures, may be used. The porous scaffold structure is washed and dried (72). The porous scaffold structure is immersed in a ferrous sulfate heptahydrate solution having a concentration of between about 0.001 and about 5 M at a pH of between about 2 and about 9 for about 10 minutes to about 60 minutes (73). The sponge is dried in an oven at greater than about 100° C. for about one hour to about eight hours (74) to form the porous iron nanocomposite article. The porous iron nanocomposite article is washed and dried (75).

To remove a pollutant, such as phosphorus, the porous iron nanocomposite article is immersed in a fluid solution containing the pollutant (76). After pollutant removal, the porous iron nanocomposite article is immersed in a solution at a pH of greater than about 12 to retrieve phosphorus from the porous iron nanocomposite article (77).

Manufacture of Copper Nanoparticle Sponge

Figure 10B:
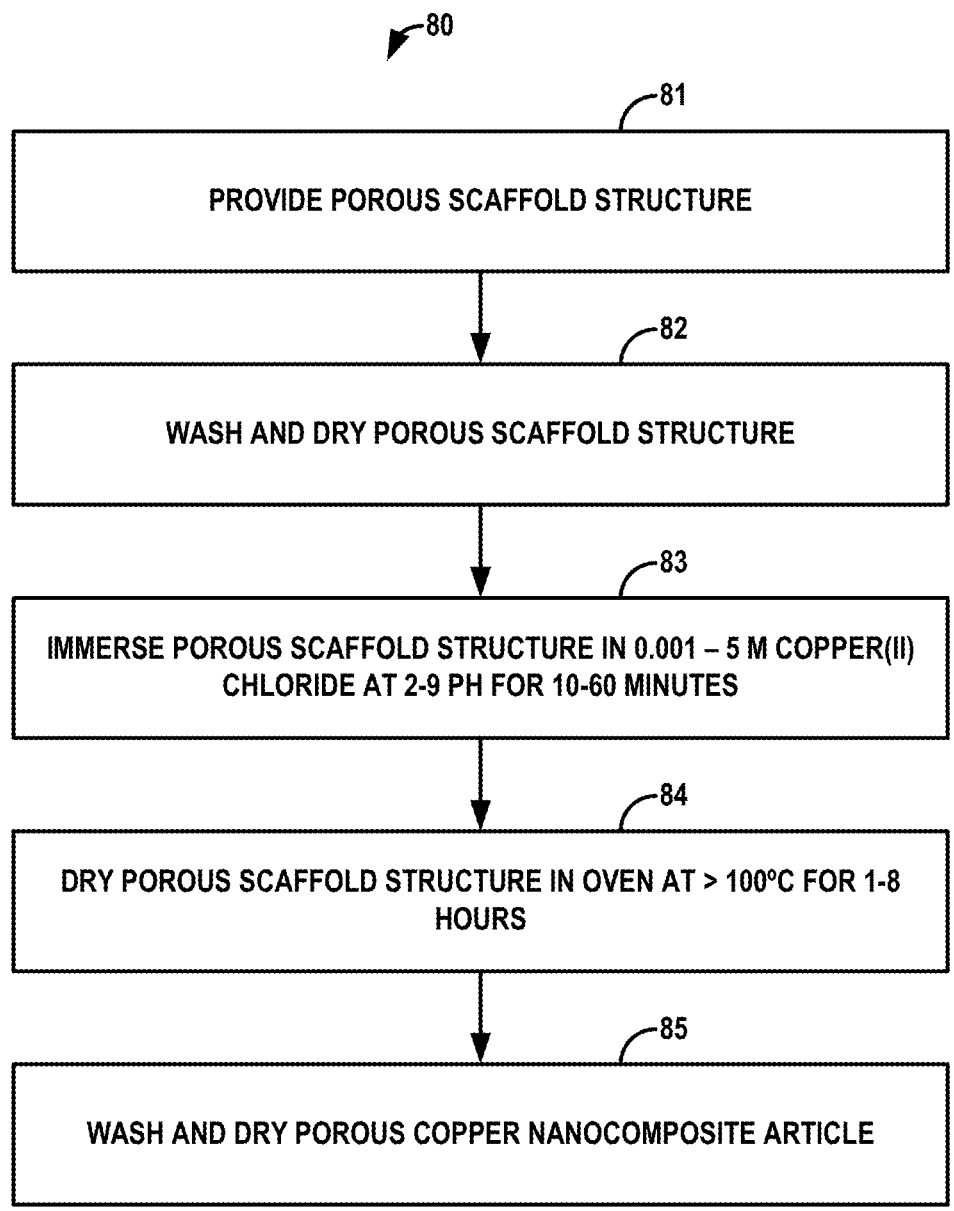
FIG. 10B is a flowchart illustrating an example method for manufacturing a porous copper nanocomposite article from copper (II) chloride, in accordance with various embodiments.

FIG. 10B is a flowchart illustrating an example method (80) for manufacturing a porous copper nanocomposite article from copper (II) chloride, in accordance with various embodiments. In the example of FIG. 10B, a porous scaffold structure is provided (81). The porous scaffold structure is washed and dried (82). The porous scaffold structure is immersed in a copper (II) chloride solution having a concentration of between about 0.001 and about 5 M at a pH of between about 2 and about 9 for about 10 minutes to about 60 minutes (83). The porous scaffold structure is dried in an oven at greater than about 100° C. for about one hour to about eight hours (84) to form the porous copper nanocomposite article. The porous copper nanoparticle sponge is washed and dried (85).

Manufacture of Selenium Nanoparticle Sponge

Figure 10C:
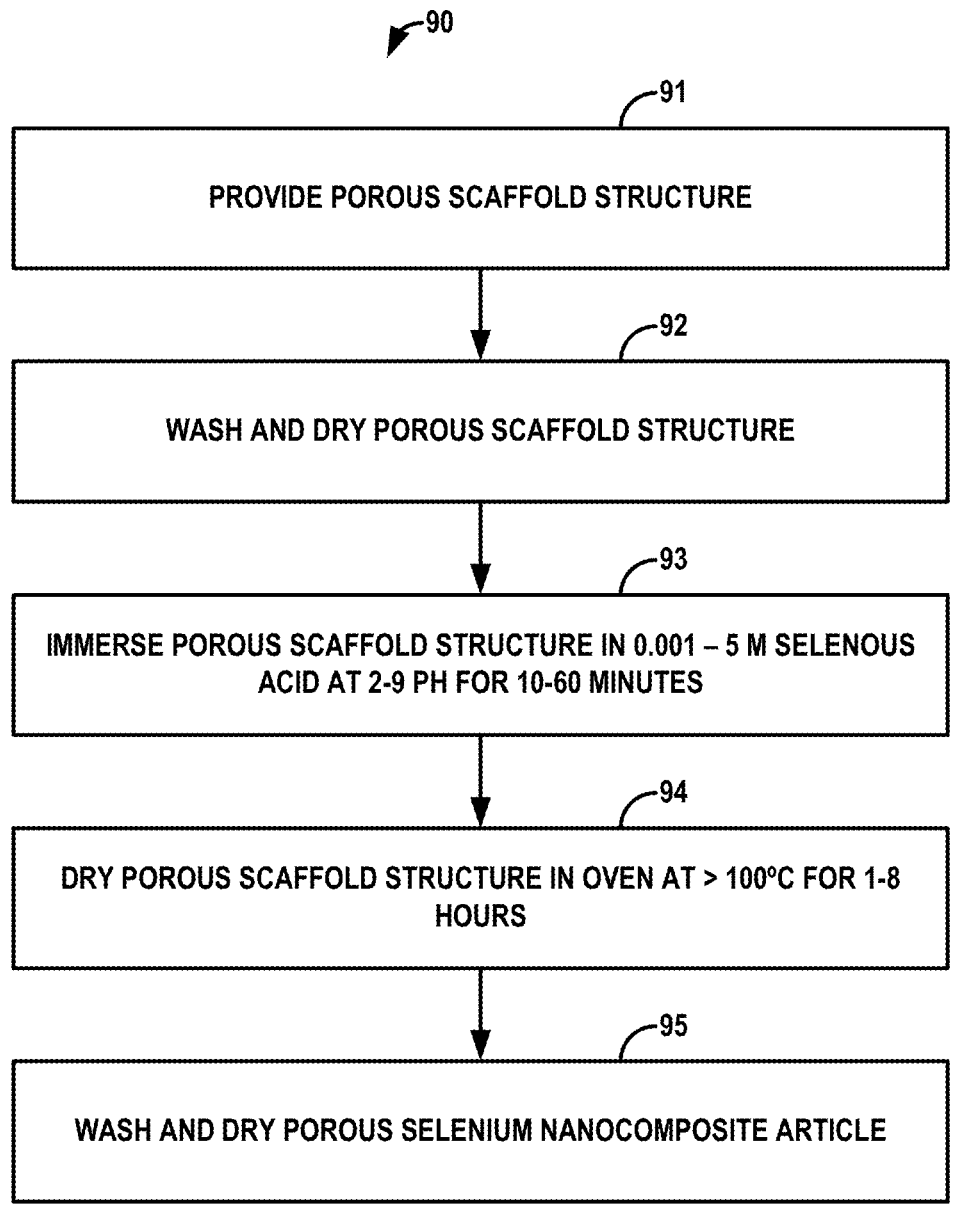
FIG. 10C is a flowchart illustrating an example method for manufacturing a porous selenium nanocomposite article from selenous acid, in accordance with various embodiments.

FIG. 10C is a flowchart illustrating an example method (90) for manufacturing a porous selenium nanocomposite article from selenous acid, in accordance with various embodiments. In the example of FIG. 10C, a porous scaffold structure is provided (91). The porous scaffold structure is washed and dried (92). The porous scaffold structure is immersed in a selenous acid solution having a concentration of between about 0.001 and about 5 M at a pH of between about 2 and about 9 for about 10 minutes to about 60 minutes (93). The porous scaffold structure is dried in an oven at greater than about 100° C. for about one hour to about eight hours (94) to form the porous selenium nanocomposite article. The porous selenium nanocomposite article is washed and dried (95).

Manufacture of Aluminum Nanoparticle Sponge

Figure 10D:
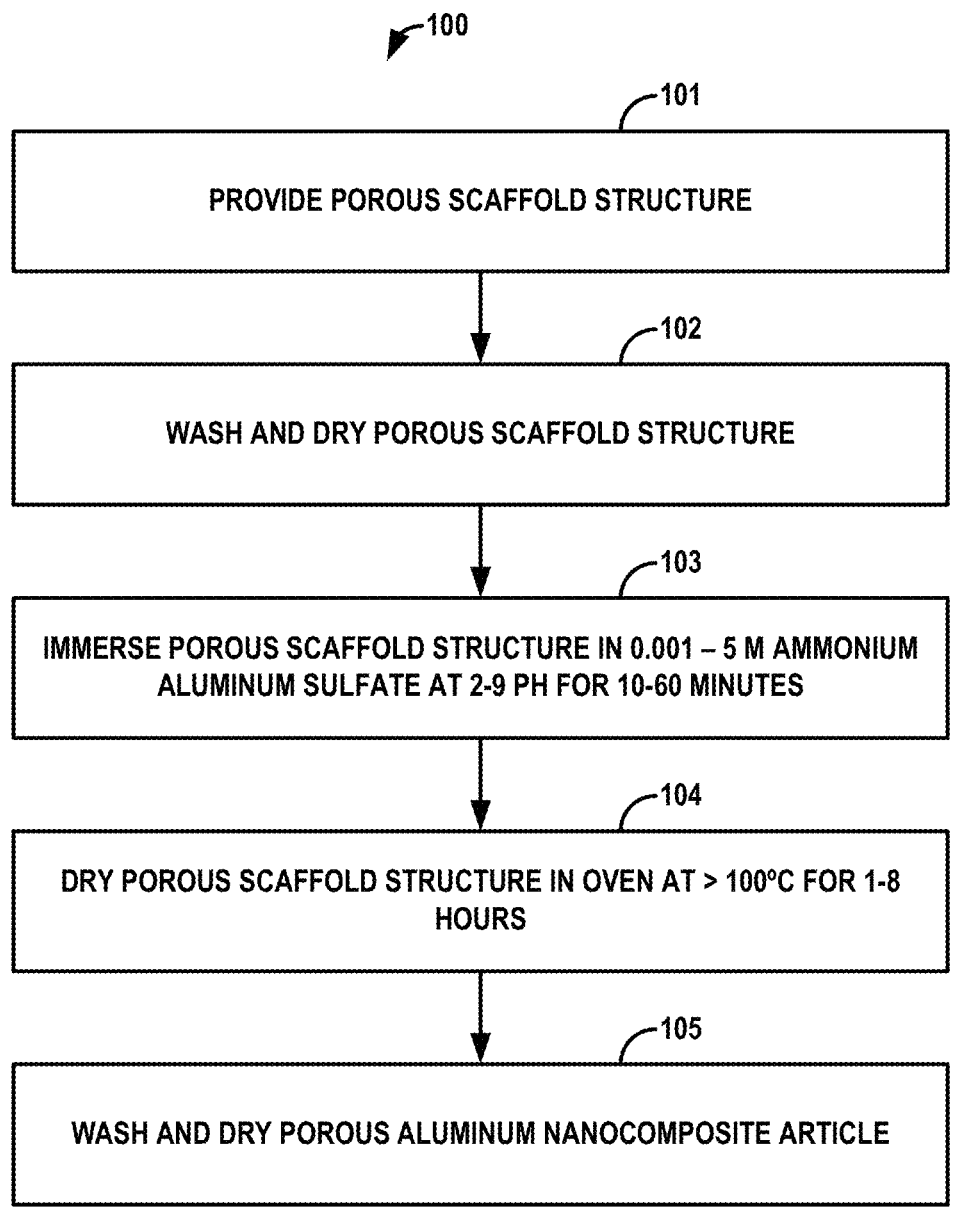
FIG. 10D is a flowchart illustrating an example method for manufacturing a porous aluminum nanocomposite article from ammonium aluminum sulfate, in accordance with various embodiments.

FIG. 10D is a flowchart illustrating an example method (100) for manufacturing a porous nanocomposite article from ammonium aluminum sulfate, in accordance with various embodiments. In the example of FIG. 10D, a porous scaffold structure is provided (101). The porous scaffold structure is washed and dried (102). The porous scaffold structure is immersed in an ammonium aluminum sulfate solution having a concentration of between about 0.001 and about 5 M at a pH of between about 2 and about 9 for about 10 minutes to about 60 minutes (103). The porous scaffold structure is dried in an oven at greater than about 100° C. for about one hour to about eight hours (104) to form the porous aluminum nanocomposite article. The porous aluminum nanocomposite article is washed and dried (105).

Manufacture of Nickel Nanoparticle Sponge

Figure 10E:
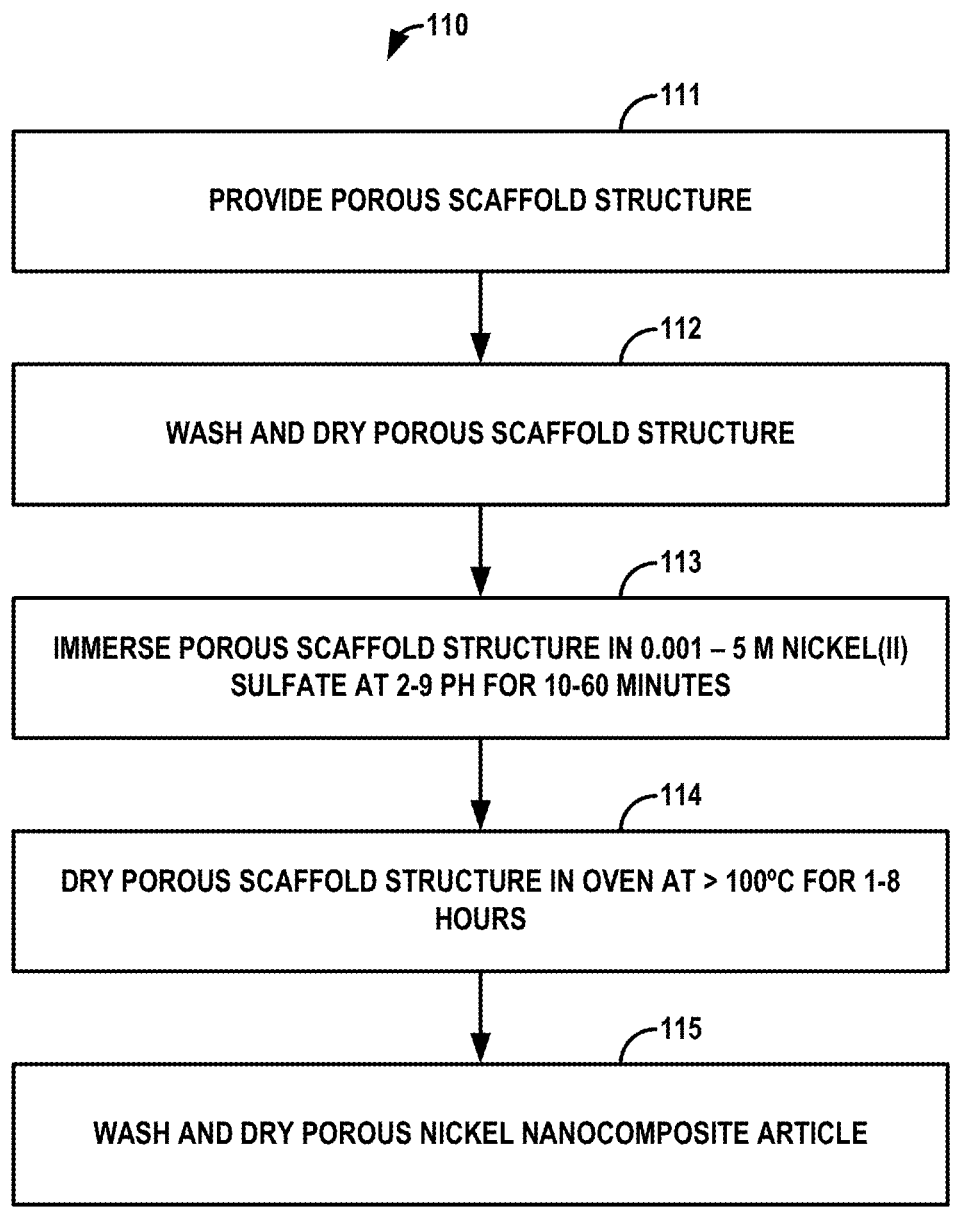
FIG. 10E is a flowchart illustrating an example method for manufacturing a porous nickel nanocomposite article from nickel (II) sulfate, in accordance with various embodiments.

FIG. 10E is a flowchart illustrating an example method (110) for manufacturing a porous nickel nanocomposite article from nickel (II) sulfate, in accordance with various embodiments. In the example of FIG. 10E, a porous scaffold structure is provided (111). The porous scaffold structure is washed and dried (112). The porous scaffold structure is immersed in a nickel (II) sulfate solution having a concentration of between about 0.001 and about 5 M at a pH of between about 2 and about 9 for about 10 minutes to about 60 minutes (113). The sponge is dried in an oven at greater than about 100° C. for about one hour to about eight hours (114) to form the porous nickel nanocomposite article. The porous nickel nanocomposite article is washed and dried (115).

Manufacture of Zinc Nanoparticle Sponge

Figure 10F:
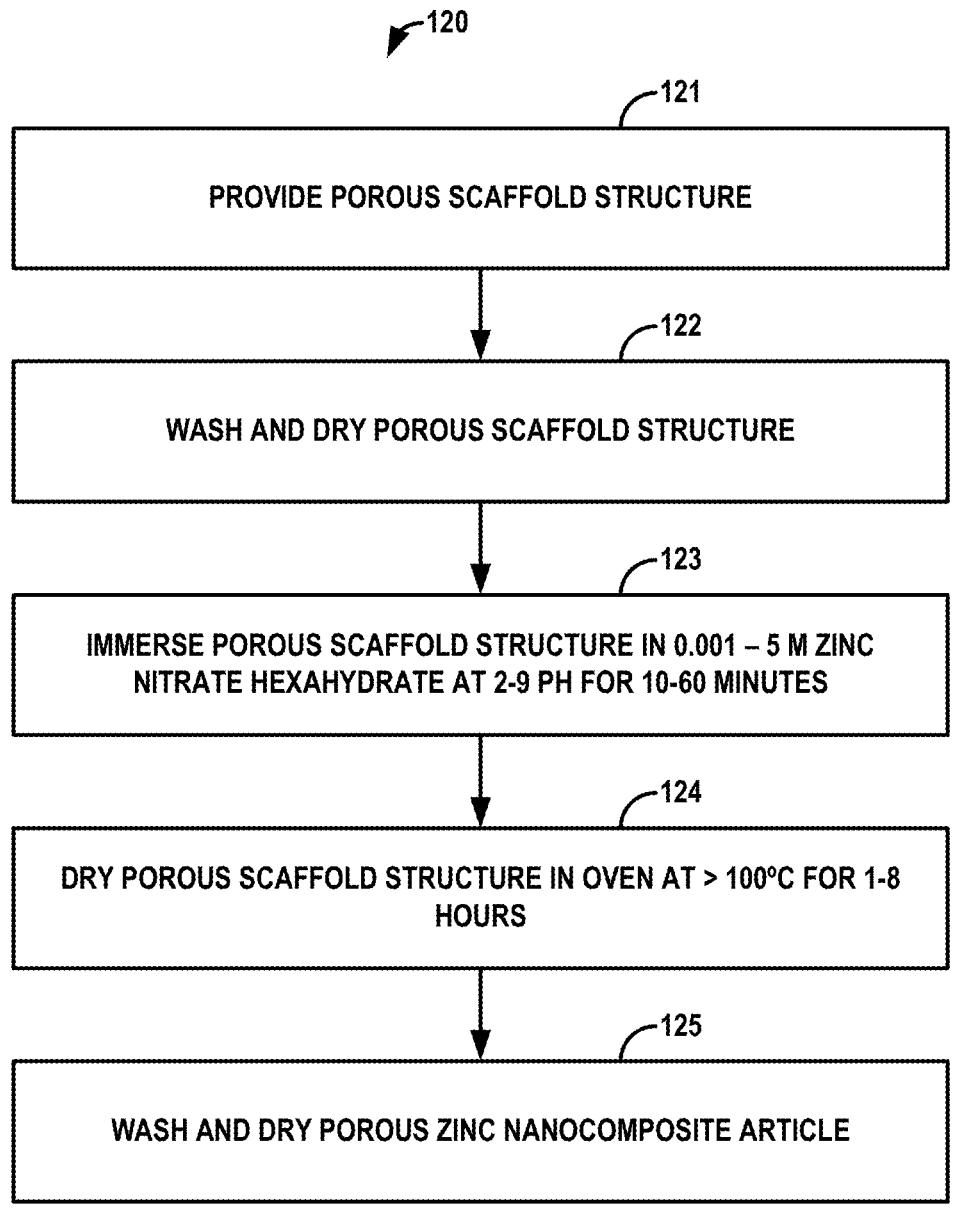
FIG. 10F is a flowchart illustrating an example method for manufacturing a porous zinc nanocomposite article from zinc nitrate hexahydrate, in accordance with various embodiments.

FIG. 10F is a flowchart illustrating an example method (120) for manufacturing a porous zinc nanocomposite article from zinc nitrate hexahydrate, in accordance with various embodiments. In the example of FIG. 10F, a porous scaffold structure is provided (121). The porous scaffold structure is washed and dried (122). The porous scaffold structure is immersed in a zinc nitrate hexahydrate solution having a concentration of between about 0.001 and about 5 M at a pH of between about 2 and about 9 for about 10 minutes to about 60 minutes (123). The porous scaffold structure is dried in an oven for at greater than about 100° C. for about one hour to about eight hours (124) to form the porous zinc nanocomposite article. The porous zinc nanocomposite article is washed and dried (125).

Manufacture of Titanium Nanoparticle Sponge

Figure 10G:
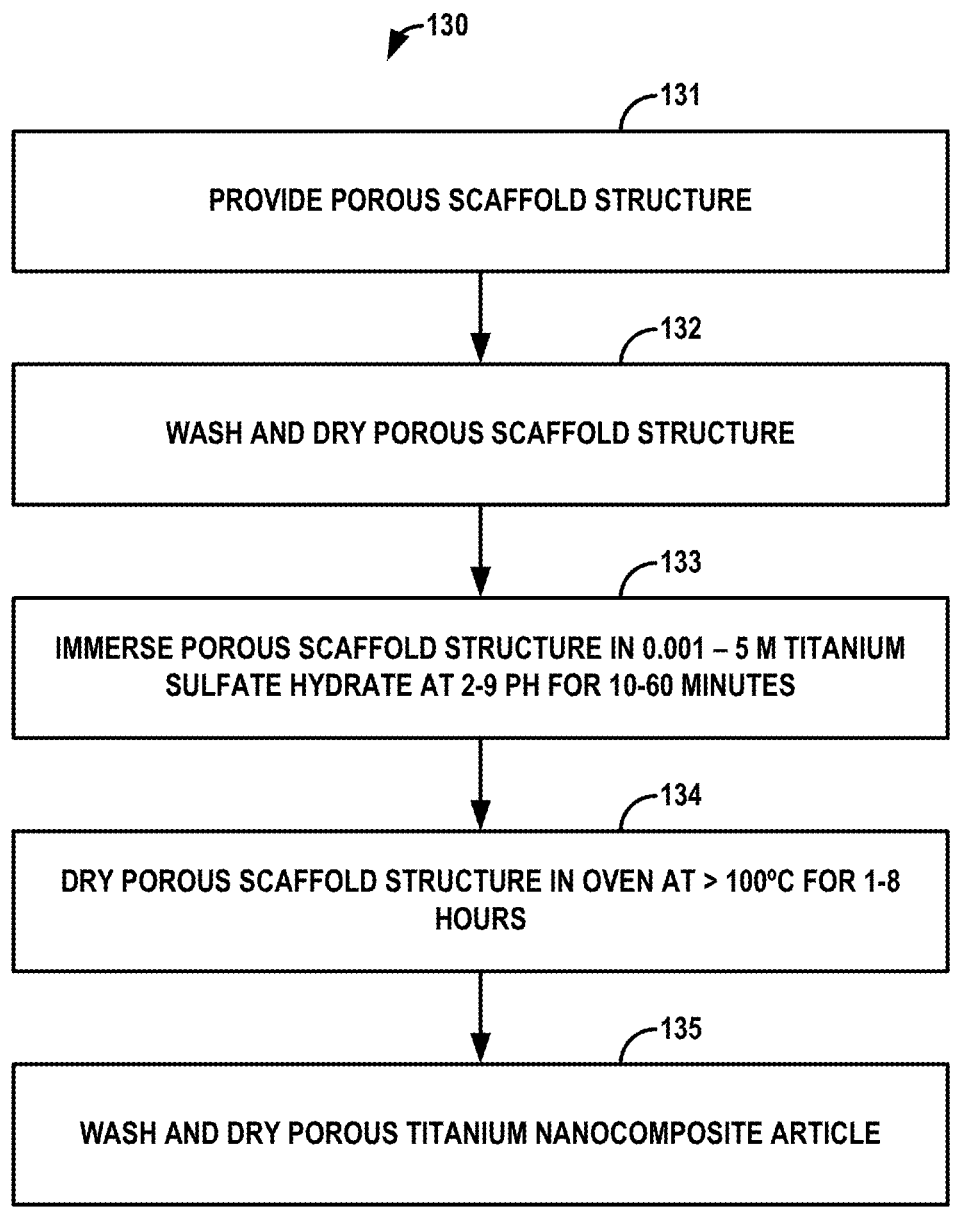
FIG. 10G is a flowchart illustrating an example method for manufacturing a porous titanium nanocomposite article from titanium sulfate hydrate, in accordance with various embodiments.

FIG. 10G is a flowchart illustrating an example method (130) for manufacturing a porous titanium nanocomposite article from titanium sulfate hydrate, in accordance with various embodiments. In the example of FIG. 10G, a porous scaffold structure is provided (131). The porous scaffold structure is washed and dried (132). The porous scaffold structure is immersed in a titanium sulfate hydrate solution having a concentration of between about 0.001 and about 5 M at a pH of between about 2 and about 9 for about 10 minutes to about 60 minutes (133). The sponge is dried in an oven at greater than about 100° C. for about one hour to about eight hours (134) to form the porous titanium nanocomposite article. The porous titanium nanocomposite article is washed and dried (135).

Manufacture of Silver Nanoparticle Textile

Figure 11:
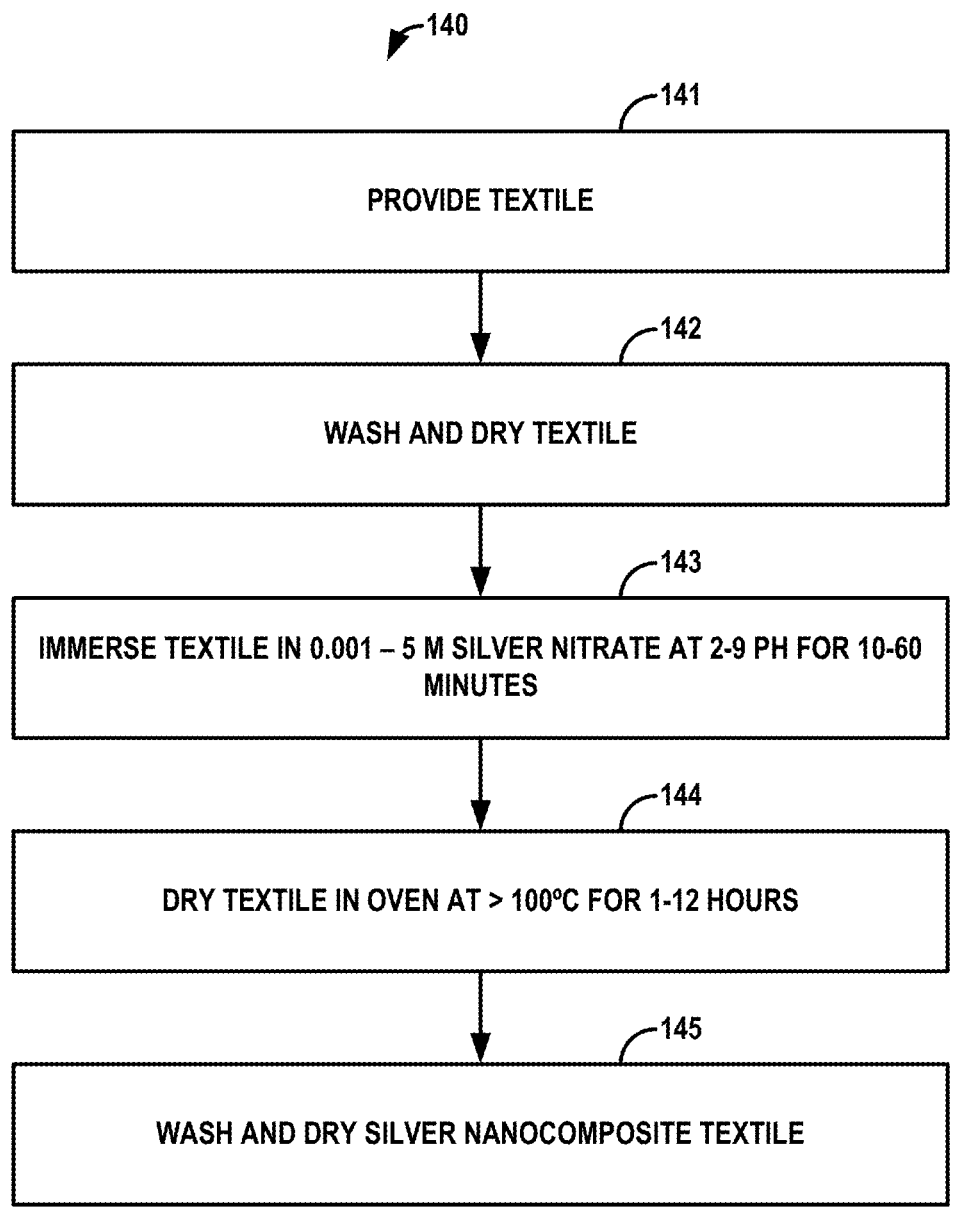
FIG. 11 is a flowchart illustrating an example method for manufacturing a silver nanocomposite textile from silver nitrate, in accordance with various embodiments.

FIG. 11 is a flowchart illustrating an example method (140) for manufacturing a silver nanocomposite textile from silver nitrate, in accordance with various embodiments. In the example of FIG. 11, a textile is provided (141). The textile is washed and dried (142). The textile is immersed in a silver nitrate solution having a concentration of between about 0.001 and about 5 M at a pH of between about 2 and about 9 for about 10 minutes to about 60 minutes (143). The textile is dried in an oven at greater than about 100° C. for about one hour to about twelve hours (144) to form the silver nanocomposite textile. The silver nanocomposite textile is washed and dried (145).

Applications of Porous Nanocomposite Articles

As described above, porous nanocomposite articles described herein may be used for a variety of applications, as shown in Table 2 below.

TABLE 2

| Nanomaterial Grown on Porous Support | Application |
| --- | --- |
| Selenium | Mercury sorbent with up to 100% capture efficiency |
| Selenium | Lead sorbent with up to 57% capture efficiency |
| Copper | Arsenic sorbent with up to 91% capture efficiency |
| Iron | Arsenic sorbent with up to 61% capture efficiency |
| Iron | Phosphate sorbent with greater than 80% capture efficiency |
| Silver | Antimicrobial materials and surfaces |
| Manganese, Aluminum | Water desalination |
| Manganese, Zinc, Titanium | Chemical catalysis and synthesis |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Additional Embodiments

The following exemplary embodiments are provided, the numbering of which is not to be construed as designating levels of importance:

Embodiment 1 provides an article, comprising: a porous scaffold structure comprising a plurality of supports; and a plurality of metallic or non-metallic nanomaterials disposed on at least one of the supports.

Embodiment 2 provides the article of Embodiment 1, wherein the porous scaffold structure comprises a resin, a metal, glass, ceramic, silicon, activated carbon or a combination thereof.

Embodiment 3 provides the article of Embodiment 1, wherein the porous scaffold structure is a sponge.

Embodiment 4 provides the article of Embodiment 3, wherein the sponge comprises a plurality of fibers.

Embodiment 5 provides the article of Embodiment 4, wherein the plurality of fibers include one or more polymers chosen from polyurethane, cellulose, polyamide, polystyrene, polyethylene terephthalate, polypropylene or mixtures thereof.

Embodiment 7 provides the article according to any one of Embodiments 1-6, wherein at least one pore of the porous article has a size in a range from about 100 nanometers to about 500 nanometers.

Embodiment 8 provides the article according to any one of Embodiments 1-7, wherein at least one metallic or non-metallic nanomaterial includes one or more metals, metals or metal oxides.

Embodiment 9 provides the article of Embodiment 8, wherein the one or more non-metals, metals or metal oxides ranges from about 5 wt % to about 100 wt % of the metallic or non-metallic nanomaterial.

Embodiment 10 provides the article of Embodiment 9, wherein at least one of the non-metals or metals is chosen from selenium, copper, zinc, iron, nickel, calcium, magnesium, titanium, mixtures thereof, or alloys thereof.

Embodiment 11 provides the article of Embodiment 9, wherein at least one of the metal oxides is chosen from iron oxide, cupric oxide, alumina, zinc oxide, nickel oxide, or mixtures thereof.

Embodiment 10 provides a system for removing a pollutant from a fluid medium, the system comprising: an article at least partially disposed within a fluid medium, the article comprising: a porous scaffold structure comprising a plurality of supports; and a plurality of metallic or non-metallic nanomaterials disposed on at least one of the supports.

Embodiment 11 provides the system of Embodiment 10, wherein the porous scaffold structure comprises a resin, a metal, glass, a ceramic, a silicon, activated carbon or a combination thereof.

Embodiment 12 provides the system of Embodiment 10, wherein the porous scaffold structure is a sponge.

Embodiment 13 provides the system of Embodiment 12, wherein the sponge comprises a plurality of fibers.

Embodiment 14 provides the system of Embodiment 13, wherein the plurality of fibers include one or more polymers chosen from polyurethane, cellulose, polyamide, polystyrene, polyethylene terephthalate, polypropylene or mixtures thereof.

Embodiment 15 provides the system according to any one of Embodiments 10-14, wherein at least one pore of the porous article has a size in a range from about 100 nanometers to about 500 nanometers.

Embodiment 16 provides the system according to any one of Embodiments 10-15, wherein at least one metallic or non-metallic nanomaterial includes one or more non-metals, metals or metal oxides.

Embodiment 17 provides the system of Embodiment 16, wherein the one or more non-metals, metals or metal oxides ranges from about 5 wt % to about 100 wt % of the metallic or non-metallic nanomaterial.

Embodiment 18 provides the system of Embodiment 17, wherein at least one of the non-metals or metals is chosen from selenium, copper, zinc, iron, nickel, calcium, magnesium, titanium, mixtures thereof, or alloys thereof.

Embodiment 19 provides the system of Embodiment 16, wherein at least one of the metal oxides is chosen from iron oxide, cupric oxide, alumina, zinc oxide, nickel oxide, or mixtures thereof.

Embodiment 20 provides the system according to any one of Embodiments 10-19, wherein the fluid medium is chosen from a liquid, gas, or a combination thereof.

Embodiment 21 provides the system of Embodiment 20, wherein the liquid is water.

Embodiment 22 provides the system of Embodiment 20, wherein the gas is atmospheric air or flue gas.

Embodiment 23 provides the system according to any one of Embodiments 10-22, wherein the pollutant is chosen from mercury, lead, arsenic, phosphate, or mixtures thereof.

Embodiment 24 provides a method of making a porous nanocomposite, the method comprising: at least partially immersing a porous article in a solution, the solution comprising: one or more non-metals, metals, metal salts, metal acids, or mixtures thereof; heating the porous article to reduce the one or more non-metals, metals, metal salts, metal acids, or mixtures thereof; and forming a plurality of metal nanomaterials on the porous article from the one or more non-metals, metals, metal salts, metal acids, or mixtures thereof.

Embodiment 25 provides the method of Embodiment 24, wherein the metal nanomaterials are formed on at least one of an external and internal surface of the porous article.

Embodiment 26 provides the method of Embodiment 24, wherein the metal nanomaterials include at least one metal chosen from selenium, copper, zinc, iron, nickel, calcium, magnesium, titanium, mixtures thereof, or alloys thereof.

Embodiment 27 provides the method of Embodiment 24, wherein the metal nanomaterials include a metal oxide chosen from iron oxide, cupric oxide, alumina, zinc oxide, nickel oxide, or mixtures thereof.

Embodiment 28 provides the method of Embodiment 24, wherein the porous article is heated at a temperature ranging from about 100° C. to about 500° C.

Various examples have been described. These and other examples are within the scope of the following claims.

What is claimed is:

1. A method of making a porous nanocomposite, the method comprising:
at least partially immersing a porous polyurethane scaffold structure in an aqueous solution to saturate the porous scaffold structure with the aqueous solution, the aqueous solution comprising one or more metal salts, metal acids, or mixtures thereof; and heating the porous scaffold structure while saturated with the aqueous solution to form and deposit, by evaporation of the aqueous solution and without adding a reducing agent, a plurality of metal nanomaterials on the porous scaffold structure from the one or more metal salts, metal acids, or mixtures thereof as the porous nanocomposite, the metal nanomaterials comprising iron, copper, aluminum, nickel, zinc and/or titanium nanomaterials, wherein each of the plurality of metallic nanomaterials is directly bound to the polyurethane porous scaffold structure of the porous nanocomposite.

2. The method of claim 1, wherein the one or more metal salts, metal acids, or mixtures thereof, include at least one of ferrous sulfate heptahydrate, copper (II) chloride, ammonium aluminum sulfate, nickel (II) sulfate, zinc nitrate hexahydrate, titanium sulfate hydrate, or combinations thereof.

3. The method of claim 1, wherein the one or more metal salts, metal acids, or mixtures thereof, are at a concentration between about 0.001 M and about 5 M.

4. The method of claim 1, wherein the aqueous solution is at a pH between about 2 and about 9.

5. The method of claim 1, wherein the metal nanomaterials are formed on at least one of an external and internal surface of the porous scaffold structure.

6. The method of claim 1, wherein the porous scaffold structure is heated at a temperature of about 100° C. or more to evaporate the aqueous solution.

7. The method of claim 1, wherein the one or more metal salts, metal acids, or mixtures thereof comprises ferrous sulfate heptahydrate, and the plurality of metallic nanomaterials comprises iron nanomaterials.

8. The method of claim 1, wherein the one or more metal salts, metal acids or mixtures thereof comprises zinc nitrate hexahydrate, and the plurality of metallic nanomaterials comprises zinc nanomaterials.

9. The method of claim 1, wherein the one or more metal salts, metal acids or mixtures thereof comprises titanium sulfate hydrate, and the plurality of metallic nanomaterials comprises titanium nanomaterials.

* * * * *